(12) United States Patent
Hayasaka et al.

(10) Patent No.: US 10,394,484 B2
(45) Date of Patent: Aug. 27, 2019

(54) STORAGE SYSTEM

(71) Applicant: Hitachi, Ltd., Tokyo (JP)

(72) Inventors: Mitsuo Hayasaka, Tokyo (JP);
Kazumasa Matsubara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/777,782

(22) PCT Filed: Feb. 26, 2016

(86) PCT No.: PCT/JP2016/055873
§ 371 (c)(1),
(2) Date: May 21, 2018

(87) PCT Pub. No.: WO2017/145375
PCT Pub. Date: Aug. 31, 2017

(65) Prior Publication Data
US 2018/0373435 A1 Dec. 27, 2018

(51) Int. Cl.
*G06F 3/06* (2006.01)
*G06F 13/10* (2006.01)

(52) U.S. Cl.
CPC ............... *G06F 3/065* (2013.01); *G06F 3/06* (2013.01); *G06F 3/067* (2013.01); *G06F 3/0619* (2013.01); *G06F 13/10* (2013.01); *G06F 2211/1028* (2013.01)

(58) Field of Classification Search
None
See application file for complete search history.

(56) References Cited

U.S. PATENT DOCUMENTS

| 6,609,176 B1* | 8/2003 | Mizuno ................. G06F 3/0601 711/112 |
| 7,231,528 B1* | 6/2007 | Yasukura ............. G06F 21/6209 380/216 |
| 7,546,342 B2 | 6/2009 | Li et al. |
| 8,019,799 B1* | 9/2011 | Batterywala ............ G06F 16/10 707/822 |
| 8,051,362 B2* | 11/2011 | Li ........................ G06F 11/1076 714/755 |

(Continued)

OTHER PUBLICATIONS

International Search Report PCT/JP2016/055873 dated May 10, 2016.

*Primary Examiner* — Kaushikkumar M Patel
(74) *Attorney, Agent, or Firm* — Mattingly & Malur, PC

(57) ABSTRACT

A first storage node generates a plurality of distributedly arranged write data blocks from write data and generates a first redundant data block from the plurality of distributedly arranged write data blocks. One distributedly arranged write data block is arranged in a second data block and the first redundant data block is arranged in a third storage node. A second storage node generates a second redundant data block from the plurality of distributedly arranged write data blocks selected from the distributedly arranged write data block held therein. The second storage node rearranges each of the plurality of selected distributedly arranged write data blocks in a rearrangement destination storage node and arranges the second redundant data block in a storage node other than the rearrangement destination storage node.

13 Claims, 17 Drawing Sheets

(56) References Cited

U.S. PATENT DOCUMENTS

| | | | | |
|---|---|---|---|---|
| 2005/0102484 A1* | 5/2005 | Liu | ......................... | G06F 3/061 |
| | | | | 711/202 |
| 2005/0216665 A1* | 9/2005 | Takakuwa | ............. | G06F 3/0613 |
| | | | | 711/114 |
| 2013/0254509 A1* | 9/2013 | Patil | ..................... | G06F 3/0611 |
| | | | | 711/170 |
| 2015/0095384 A1* | 4/2015 | Antony | ................ | G06F 16/183 |
| | | | | 707/827 |

* cited by examiner

FIG. 4A

| OBJECT ID | PRIORITY | CONFIGURATION NODE | REARRANGEMENT PROCESS STATE | DIVISION SIZE |
|---|---|---|---|---|
| ... | ... | ... | NOT YET | 32KB |
| | | | BEING REARRANGED | 1MB |
| | | | COMPLETED | ... |
| | | | ... | |
| | | | | |

METADATA MANAGEMENT TABLE

FIG. 4B

| RANGE (LBA) | CONFIGURATION NODE | DIVISION SIZE |
|---|---|---|
| ... | ... | ... |
| | | |
| | | |
| | | |

DISTRIBUTED DATA MANAGEMENT TABLE

FIG. 5A

| CHECK POINT NUMBER (C46) | FLAG (C47) | ADDRESS (LBA) (C48) |
|---|---|---|
| ... | ... | ... |
| | | |
| | | |
| | | |

ADDITIONAL WRITE METADATA STRUCTURE

FIG. 5B

| RANGE (LBA) (C42) | COPY DESTINATION CONFIGURATION NODE (C44) |
|---|---|
| ... | ... |
| | |
| | |
| | |

COPY HOLDING NODE MANAGEMENT TABLE

TO REARRANGEMENT PROCESS

STORAGE SYSTEM

TECHNICAL FIELD

The present invention relates to a storage system.

BACKGROUND ART

The amount of data to be handled by an IT system is rapidly increasing, and a storage system that can deal with it is required. As such a storage system, there is a distributed storage system technology in which a plurality of storage devices (including servers) are connected by a network to create a storage pool, and data is distributed, processed, and stored. This provides scalable capacity and performance.

An example of a distributed storage system is disclosed in, for example, U.S. Pat. No. 7,546,342. Specifically, as described in the abstract, the following configuration is disclosed. A relative importance for each file associated with a web site is calculated. The relative importance is used to calculate a plurality of subsets of content which are distributed to a plurality of devices within a computer cluster, such as a server array, a peer-to-peer network, and the like. The subsets can include coded messages created using an erasure coding scheme on packets containing portions of one or more files. Upon retrieving a file, a fixed number of distinct coded messages are retrieved from the devices based on the erasure coding scheme. The file is re-created with these messages.

CITATION LIST

Patent Literature

PTL 1: U.S. Pat. No. 7,546,342

SUMMARY OF INVENTION

Technical Problem

A conventional distributed storage system distributes write data received from a host to a plurality of storage nodes. Therefore, when an application program reads data from the distributed storage system, it is necessary to transfer a data block constituting the data through a network between the plurality of storage nodes. Therefore, the throughput of the network may become a bottleneck, and the access latency to data may increase more than in the case of not passing through the network.

Solution to Problem

In order to solve the above problem, for example, the configurations described in the scope of the claims are adopted.

As a representative example of the present invention, a storage system including a plurality of storage nodes connected via a network includes a first storage node, a second storage node, and a third storage node, wherein the first storage node receives write data of an object, the first storage node generates a plurality of distributedly arranged write data blocks from the write data and generates a first redundant data block from the plurality of distributedly arranged write data blocks, the first storage node transmits each of the plurality of distributedly arranged write data blocks and the first redundant data block to different storage nodes, the different storage node include the second storage node and the third storage node, and an arrangement destination of the first redundant data block is the third storage node, the second storage node selects a plurality of distributedly arranged write data blocks from distributedly arranged write data blocks held therein, and rearrangement destination storage nodes of the plurality of selected distributedly arranged write data blocks are different from one another, an arrangement destination of a second redundant data block generated from the plurality of selected distributedly arranged write data blocks is the third storage node, the second storage node generates the second redundant data block from the plurality of selected distributedly arranged write data blocks, and the second storage node rearranges each of the plurality of selected distributedly arranged write data blocks to the rearrangement destination storage node and further arranges the second redundant data block to a storage node other than the rearrangement destination storage node, so that the write data of the object received by the first storage node is rearranged to any one of the plurality of storage nodes.

Advantageous Effects of Invention

According to the present invention, it is possible to achieve both high reliability and high performance in a storage system. The problems, configurations, and effects other than those described above will become apparent from the following description of the embodiments.

BRIEF DESCRIPTION OF DRAWINGS

FIG. 4A illustrates a configuration example of a metadata management table.
FIG. 4B illustrates a configuration example of a distributed data management table.
FIG. 5A illustrates a configuration example of a metadata structure T used in Embodiment 3.
FIG. 5B illustrates a configuration example of a copy holding node management table used in Embodiment 4.

DESCRIPTION OF EMBODIMENTS

Several embodiments will be described with reference to the drawings. It should be noted that the embodiments described below do not limit the invention according to the claims, and all the elements and combinations thereof described in the embodiments are not essential to the solution of the invention.

In the following description, a variety of information is described with the expression "XX table", but a variety of information may be represented by a data structure other than the table. In order to show that it is not dependent on the data structure, the "XX table" can be referred to as "XX information".

In the following description, there are cases where the process is described with the program as the subject, but the program is performed by hardware itself or a processor (for example, micro processor (MP)) of the hardware, and a predetermined process is appropriately performed by using memory resources (for example, a memory) and/or communication interface devices (for example, a port). Thus, the subject of the process may be the hardware or the processor. A program source may be, for example, a program distribution server or a memory medium.

In the following, a method for improving performance by rearranging highly reliable data in a distributed storage system is disclosed. A storage node includes one or more memory devices for storing data. Hereinafter, a memory region provided by one or more memory devices is referred to as a media region. The memory device is, for example, a hard disk drive (HDD), a solid state drive (SSD), a RAID consisting of a plurality of drives, or the like.

Embodiment 1

Figure 1A:
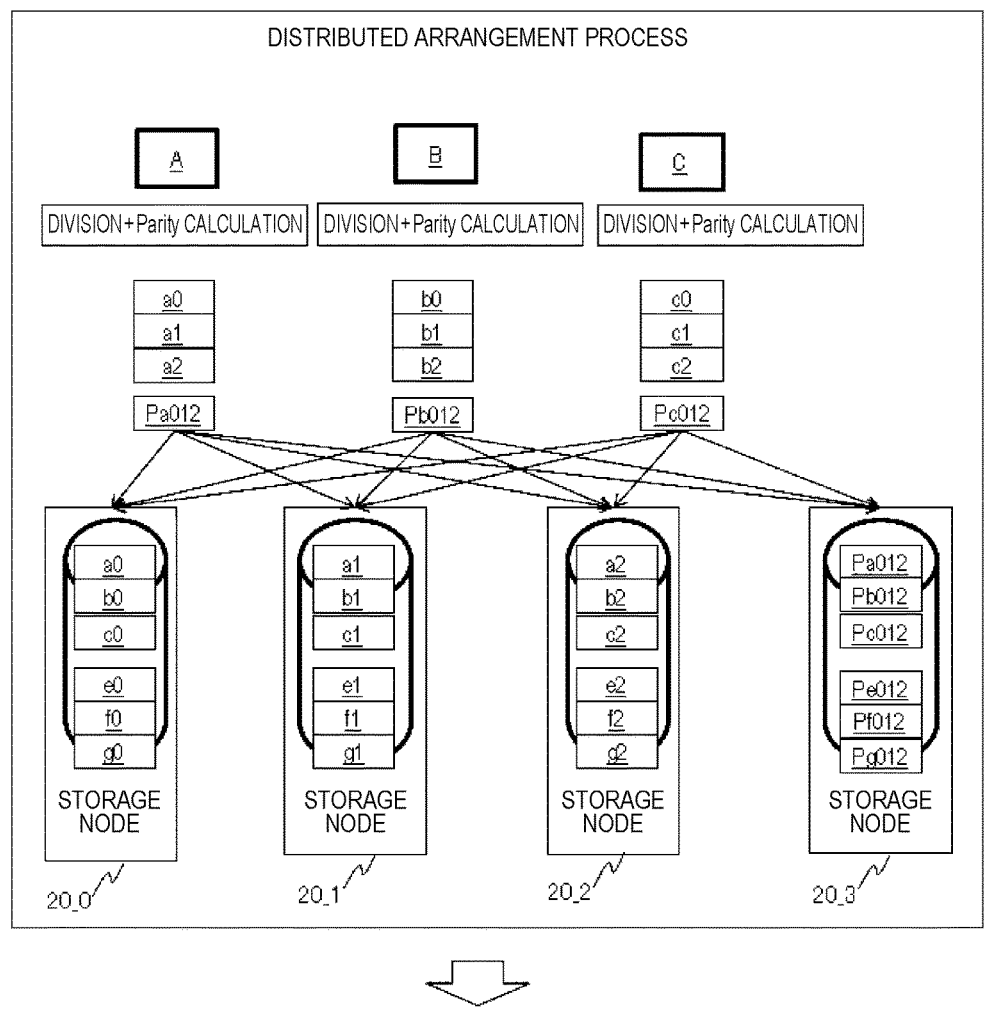
FIG. 1A illustrates the overview of Embodiment 1.
Figure 1B:
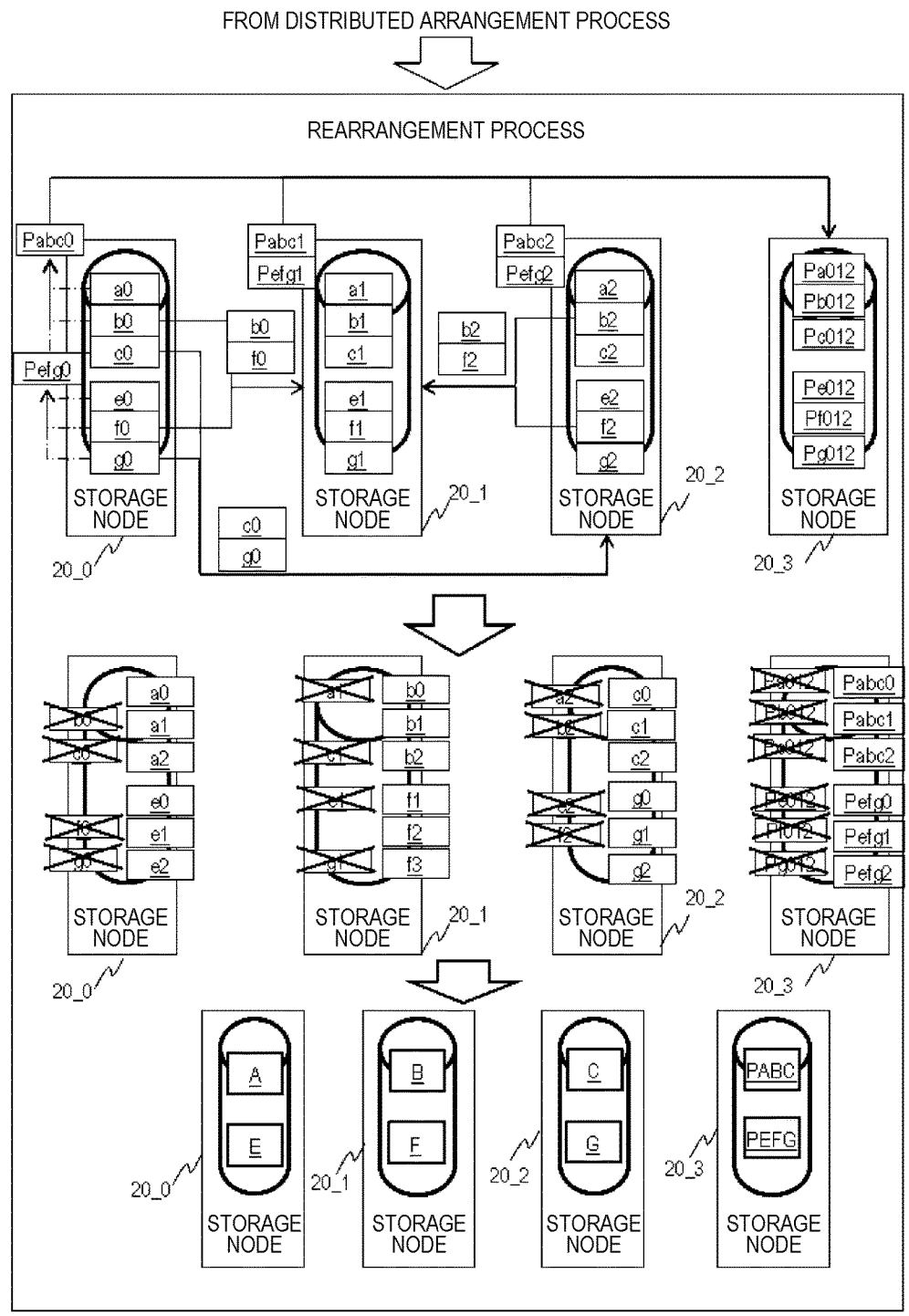
FIG. 1B illustrates the overview of Embodiment 1.

FIGS. 1A and 1B illustrate the overview of this embodiment. The distributed storage system includes a plurality of storage nodes (also simply referred to as nodes) connected via a network, and some of the storage nodes 20_0 to 20_3 are illustrated. FIG. 1A illustrates an example of a distributed arrangement process of received data by the distributed storage system. FIG. 1B illustrates an example of a rearrangement process of distributedly arranged data.

The distributed storage system manages data for each object which is logically organized data. In addition, the access to data occurs for each object. As the object, there are an archive file, a backup file, an object for storing directory information, an object for managing empty blocks, a virtual volume, and a volume file of a virtual computer, in addition to an ordinary file. The object can also be a part of a file or a part of a volume.

The distributed arrangement process distributedly arranges write data (which may include dummy data) of each object and redundant data generated from the write data in the plurality of storage nodes. The rearrangement process moves data of one or each of the plurality of objects distributedly arranged in the plurality of storage nodes to a storage node (referred to as a local node) associated with each object. The number of local nodes of one object is one or more.

The rearrangement process further generates redundant data from data of different local nodes stored in one storage node and arranges the redundant data in a storage node different from the local node, which is a storage node different from the one storage node.

Therefore, high reliability and high performance of the distributed storage system can be realized the distributed arrangement process of the write data (host data) accompanying the redundant data and the rearrangement process of the write data (host data) to the local node accompanying the redundant data.

As illustrated in FIG. 1A, for example, the distributed storage system receives write data A, B, and C from one or a plurality of hosts. The write data A, B, and C are write data for A, B, and C objects (not illustrated), respectively.

The storage node having received the write data performs a data block division process and a redundant data block generation process on the received write data. The write data is divided, and a host data block (distributedly arranged write data block) of a specified division size is generated. The division size is specified for each object. The generated host data block may include a dummy data block.

Furthermore, the redundant data block is generated by erasure coding using host data blocks. The redundant configuration illustrated in FIGS. 1A and 1B includes only one redundant data block, but the number of each of the host data blocks and the redundant data blocks is dependent on the design.

In FIG. 1A, host data blocks a0, a1, and a2 and a redundant data block Pa012 are generated from write data A. Host data blocks b0, b1, and b2 and a redundant data block Pb012 are generated from write data B. Host data blocks c0, c1, and c2 and a redundant data block Pc012 are generated from write data C.

The host data blocks and the redundant data block generated from the same received data constitute a stripe. The stripe consists of a plurality of host data blocks and one or a plurality of redundant data blocks generated from the plurality of host data blocks, and the number of the host data blocks and the redundant data blocks is dependent on the design of the redundant configuration in the system.

The host data block is generated according to, for example, an offset within the object (intra-object address). For example, the division position of the write data is calculated from the intra-object offset and the specified size (division size). Instead of the offset in the object, an offset in the received data may be used to divide the write data into the data block of the specified size from the head of the received data.

The host data block having an integer multiple of the specified number dependent on the redundant configuration of the object is generated from the received data. In the example of FIG. 1, the specified number of A, B and C objects is 3, which is equal to the number of the host data blocks in the redundant stripe.

In FIG. 1A, the host data block and the redundant data block generated from the same received data are distributedly arranged in different storage nodes. The storage node temporarily stores the data block in a cache and then stores the data block in a storage device. The storage device is an SSD, an HDD, a nonvolatile memory, and a RAID consisting of these devices, and the cache may be omitted.

The storage node stores data in the managed storage device, and the managed storage device is accessed without passing through another storage node. The storage device is, for example, directly accessed from a controller or connected through a switch.

In the example of FIG. 1A, the host data blocks of the received data A, B, and C are distributedly stored in the storage nodes 20_0, 20_1, and 20_2. The host data blocks of the same received data are arranged in the storage nodes 20_0, 20_1, and 20_2 in order from the head. The redundant data blocks of the received data A, B, and C are stored in the storage node 20_3. FIG. 1A illustrates an example in which there is only one redundant data block. In a configuration in which a plurality of redundant data blocks are generated, a storage node for storing each of the redundant data blocks is prepared.

The storage nodes 20_0 to 20_3 already store received data E, F, and G of E, F, and G objects. Host data blocks e0 to e2 and a redundant data block Pe012 are data blocks of the received data E. Host data blocks f0 to f2 and a redundant data block Pf012 are data blocks of the received data F. Host data blocks g0 to g2 and a redundant data block Pg012 are data blocks of the received data G. The method for distributedly arranging the host data blocks and the redundant data blocks in the storage nodes 20_0 to 20_3 are similar to those of the received data A, B, and C.

A set of storage nodes for storing the data blocks of the object is preset. For an object ID, a set of a plurality of storage nodes for storing host data blocks and one or a plurality of storage nodes for storing redundant data blocks (also referred to as parity data blocks) is defined. In the example of FIG. 1A, the sets of the storage nodes of the A to E objects are identical to each other and consist of the storage nodes 20_0 to 20_3.

A storage node (also referred to as a data node) for storing the host data block is assigned to a set of an object ID and an offset of the host data block. The offset is an offset within the object or the received data.

A node (referred to as a parity node) for storing the redundant data block is, for example, fixed with respect to the object. That is, the parity node is assigned only to the object ID and is not dependent on the data offset (address). When one stripe includes a plurality of redundant data blocks, a plurality of parity nodes are specified for the object ID, and a parity node to be stored is defined according to a type of the redundant data block. In the example of FIG. 1A, there is only one parity node, and the parity node is associated only with the object ID and is common to the entire data blocks (stripes) in the object. Specifically, the parity node of the A to E objects is the storage node 20_3.

In another example, a parity node may be assigned to a set of an object ID and an offset within an object or received data. The redundant data block is generated from a plurality of host data blocks to which the same parity node is assigned in the object. For example, a plurality of storage nodes are assigned to an object, and a parity node for the host data block is selected from among them according to the offset of the host data block.

The set of distributedly arrangement destination nodes of the data blocks may be designated by using other algorithms. For example, a consistent hash algorithm such as controlled replication under scalable hashing (CRUSH) or a distributed hash table may be used to designate a set of distributed arrangement destination nodes of data blocks including host data and redundant data from the object ID and the number of nodes. The distributed arrangement destination node can be easily and appropriately determined by determining the distributed arrangement destination node from the object ID by any of the algorithms.

FIG. 1B illustrates an example of a rearrangement process of distributedly arranged host data blocks (which may include dummy data). One or a plurality of local nodes are assigned to one object. The host data block in which objects are distributedly arranged is rearranged and stored in the corresponding local node. When a plurality of local nodes are assigned to one object, the local node of the host data block is associated with a set of an object ID and an offset.

One or a plurality of parity nodes are assigned to one object. The parity node stores redundant data newly generated in the rearrangement process. The newly generated redundant data block is generated from the host data block to which the common parity nodes stored in different local nodes are assigned. Each of the redundant data blocks is generated from the host data block stored in one storage node.

For example, the parity node is assigned only to the object ID and is not dependent on the offset (address) of the data, and the parity node in the distributed arrangement process and the parity node in the rearrangement process are identical to each other.

In another example, a plurality of parity nodes are designated and each parity node may be assigned to a set of an object ID and an offset within an object or received data. The set of parity nodes in the rearrangement and the set of parity nodes in the distributed arrangement are identical to or different from each other.

For example, one node configuration is previously associated with an object group consisting of a plurality of objects, and the rearrangement process is performed between data of objects having the same node configuration in the distributed arrangement process. This enables efficient data management. It is performed between the host data (which may include dummy data) in the distributed arrangement process or the data of the objects in which the nodes for storing the redundant data are common to each other. The rearrangement process may be performed between data of objects having different node configurations in the distributed arrangement process.

In the example of FIG. 1B, the A to E objects have the same node configuration in the distributed arrangement, and the rearrangement process is performed between them. In the A to E objects, new redundant data blocks are generated from the host data blocks of three objects with different local nodes.

In the example of FIG. 1B, one local node is assigned to each object. The storage node 20_0 is a local node of the write data A and the write data E. The storage node 20_1 is a local node of the write data B and the write data F. The storage node 20_2 is a local node of the write data C and the write data G.

In the example of FIG. 1B, one parity node is assigned to each object, and this is common to A to E objects. The storage node 20_3 stores the redundant data block newly generated in the data rearrangement. The respective redundant data blocks are generated from host data blocks stored in different storage nodes after the rearrangement.

In FIG. 1B, a redundant data block Pabc0 is generated from the host data blocks a0, b0, and c0. A redundant data block Pabc1 is generated from the host data blocks a1, b1, and c1. A redundant data block Pabc2 is generated from the host data blocks a2, b2, and c2.

A redundant data block Pefg0 is generated from the host data blocks e0, f0, and g0. A redundant data block Pefg1 is generated from the host data blocks e1, f1, and g1. A redundant data block Pefg2 is generated from the host data blocks e2, f2, and g2.

When the local nodes are different, it is possible to combine arbitrary objects for generating redundant data blocks. For example, the host data block of the A object can generate the redundant data together with the host data block of any two objects other than the E object, and the host data block of the B object can generate the redundant data together with the host data block of any two objects other than the F object. A combination of offsets of the host data blocks for generating the redundant data blocks is not limited thereto and is optional.

In FIG. 1B, the sizes of the host data blocks are identical to each other. In the combination of the host data blocks for generating the redundant data blocks, the sizes (division sizes) of the host data blocks of different objects may be different from each other. For example, the division size of a certain object may be an integer multiple of the division size of another object.

When the division size of the A object is N times (N is an integer) the division size of the B and C objects, one redundant data block can be generated from one host data block of the A object, N host data blocks of the B object, and N host data blocks of the C object.

The redundant data PABC consists of the redundant data blocks Pabc0, Pabc1, and Pabc2. The redundant data PEFG consists of the redundant data blocks Pefg0, Pefg1, and Pefg2.

When each of the storage nodes holds a host data block capable of performing the rearrangement process, the rearrangement of the host data block is started. When the storage node holes the host data blocks, of which the parity nodes are identical to each other and the local nodes are different from each other, as many as necessary for generating the redundant data, the storage node can perform the rearrangement process. The condition for starting the rearrangement process may include that the amount of data to be rearranged has reached a specified value.

In FIG. 1B, in order to generate the redundant data, three host data blocks having different local nodes are required. In addition, in one storage node, it may be the condition for starting the rearrangement process that two stripes of host data have been stored.

In FIG. 1B, each storage node generates the redundant data from the host data block to be rearranged. The storage node 20_0 generates the redundant data block Pabc0 from the host data blocks a0, b0, and c0 and generates the redundant data block Pefg0 from the host data blocks e0, f0, and g0.

The storage node 20_1 generates the redundant data block Pabc1 from the host data blocks a1, b1, and c1 and generates the redundant data block Pefg1 from the host data blocks e1, f1, and g1. The storage node 20_2 generates the redundant data block Pabc2 from the host data blocks a2, b2, and c2 and generates the redundant data block Pefg2 from the host data blocks e2, f2, and g2.

As described above, in order to generate the redundant data, a combination of other host data blocks is also possible. For example, one storage node may select a combination of the A, B, and C objects and a combination of the E, F, and G objects, and another storage node may select a combination of the A, F, and C objects and a combination of the E, B, G objects.

Each of the storage nodes 20_0 to 20_2 collectively transmits the generated redundant data blocks to the storage node 20_3, and further collectively transmits the host data blocks of the same local node to the local node. This reduces the number of data communications on the network.

For example, the storage node 20_0 includes the redundant data blocks Pabc0 and Pefg0 in one communication data unit and transmits the communication data unit to the storage node 20_3. In addition, the storage node 20_0 includes the host data blocks b0 and f0 in one communication data unit and transmits the communication data unit to the storage node 20_1, and includes the host data blocks c0 and g0 in one data unit and transmits the data unit to the storage node 20_2.

The local nodes (the storage nodes 20_0 to 20_2) update the corresponding objects held by the received host data blocks. The storage nodes (storage nodes 20_0 to 20_2) delete the unnecessary host data blocks in which the redundancy is secured after transmission to another storage node in the rearrangement process. For example, after the host data block is rearranged and the redundant data block generated for rearrangement from the host data block is stored in the parity node, the old data of the host data block is deleted.

After the redundant data is received from another storage node, the parity node (storage node 20_3) deletes the unnecessary redundant data block in which the redundancy is secured. In the example of FIG. 1B, the storage node 20_3 deletes redundant data blocks Pa012, Pb012, Pc012, Pe012, Pf012, and Pg012. For example, after the entire host data blocks are rearranged in the generation elements of the redundant data blocks and new redundant data blocks of the entire host data blocks are stored, the redundant data blocks are deleted.

When the application (host) needs the data of the object by the rearrangement process, the local read can be realized and the performance can be improved without transferring the data block in the network between the storage nodes.

Figure 2:
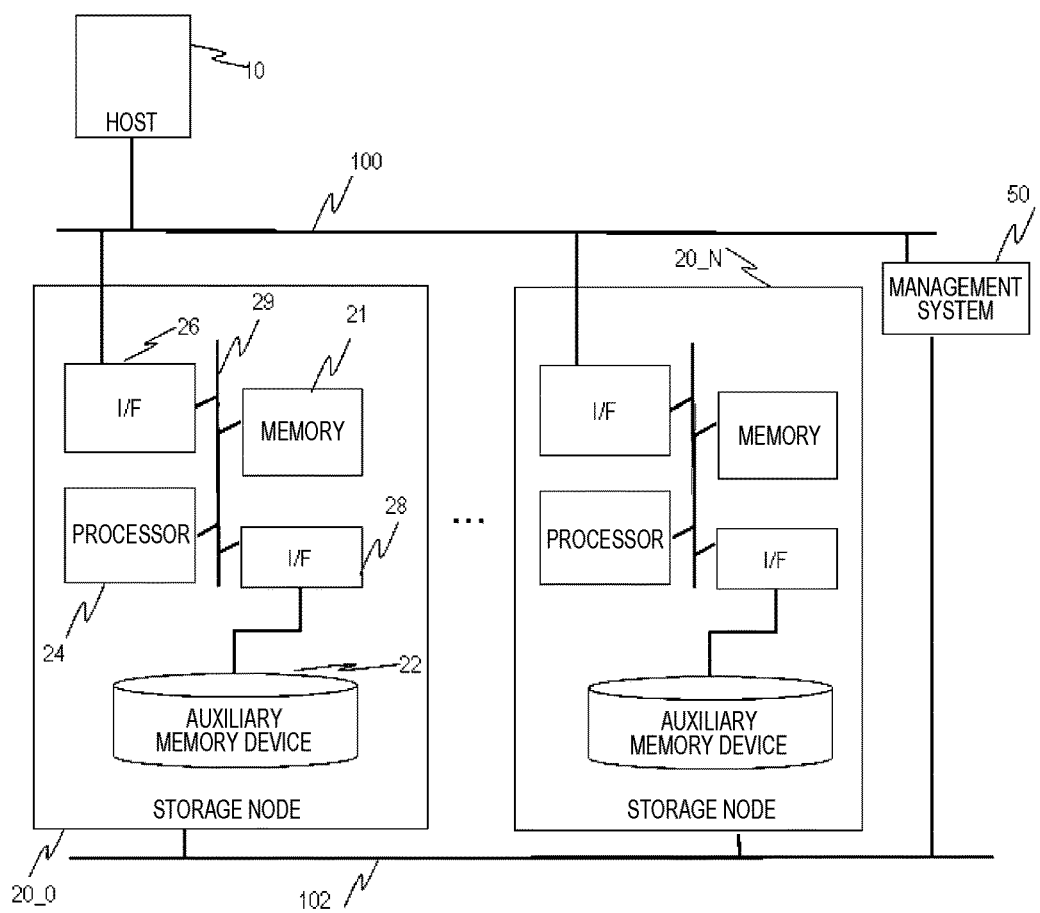
FIG. 2 illustrates a hardware configuration example of a distributed storage system.

FIG. 2 illustrates a hardware configuration example of the distributed storage system. In the example of FIG. 2, the distributed storage system includes a plurality of storage nodes 20_0 to 20_N and a management system 50. The storage nodes 20_0 to 20_N are connected to each other via an internal network 102 and further connected to the management system 50.

In order to manage the storage nodes 20_0 to 20_N, an independent network may be created. The storage nodes 20_0 to 20_N are connected to one or a plurality of hosts 10 (only one host is exemplified) via a data network 100. One host 10 is, for example, a server computer, a file storage device of a branch office, a PC, a smartphone, or the like.

The management system 50 consists of one or a plurality of computers. The management system 50 includes, for example, a server computer and a terminal which accesses the server computer via the network. An administrator manages and controls the storage nodes 20_0 to 20_N via a display device and an input device of the terminal.

Each of the internal network 102 and the data network 100 is, for example, a Wide Area Network (WAN), a Local Area Network (LAN), the Internet, a Storage Area Network (SAN), a public line, a dedicated line, or the like. The internal network 102 and the data network 100 may be the same network.

The storage node can have a configuration of a general-purpose computer. In FIG. 2, the storage node 20_0 includes a memory 21, an auxiliary memory device 22, a processor 24, an interface (I/F) 26 of the data network, and an I/F 28 between the auxiliary memory device 22 and another device. The memory 21, the processor 24, the I/F 26, and the I/F 28 are connected to a bus 29. Both the memory 21 and the auxiliary memory device 22 are memory devices managed by the processor 24. The auxiliary memory device 22 may be a direct access storage, or may be accessed through a switching device. Another storage nodes may have the same configuration.

Typically, the data stored in the memory 21 is data transferred via the network 100 or 102 or data loaded from the auxiliary memory device 22. The auxiliary memory device 22 consists of, for example, one or more HDDs, SSDs, or RAIDs. In addition to storing the object or redundant data after rearrangement, the auxiliary memory device 22 also provides a region for temporarily storing the object or control information before the rearrangement process is completed.

The memory 21 is used for memorizing information read from the auxiliary memory device 22 and is used as a cache memory for temporarily storing data received from the host 10. The memory 21 is further used as a work memory of the processor 24. As the memory 21, a volatile memory such as a DRAM or a nonvolatile memory such as a flash memory is used. The memory 21 can read and write data at a speed which is higher than that of the auxiliary memory device 22. The auxiliary memory device 22 may be omitted.

The processor 24 operates according to a program, an operation parameter, or the like, which is stored in the memory 21. The processor 24 operates as a specific functional unit by operating according to the program. For example, the processor 24 functions as a data division and reconfiguration unit by operating according to a data division and reconfiguration program 220 to be described later. The same applies to other programs.

Figure 3:
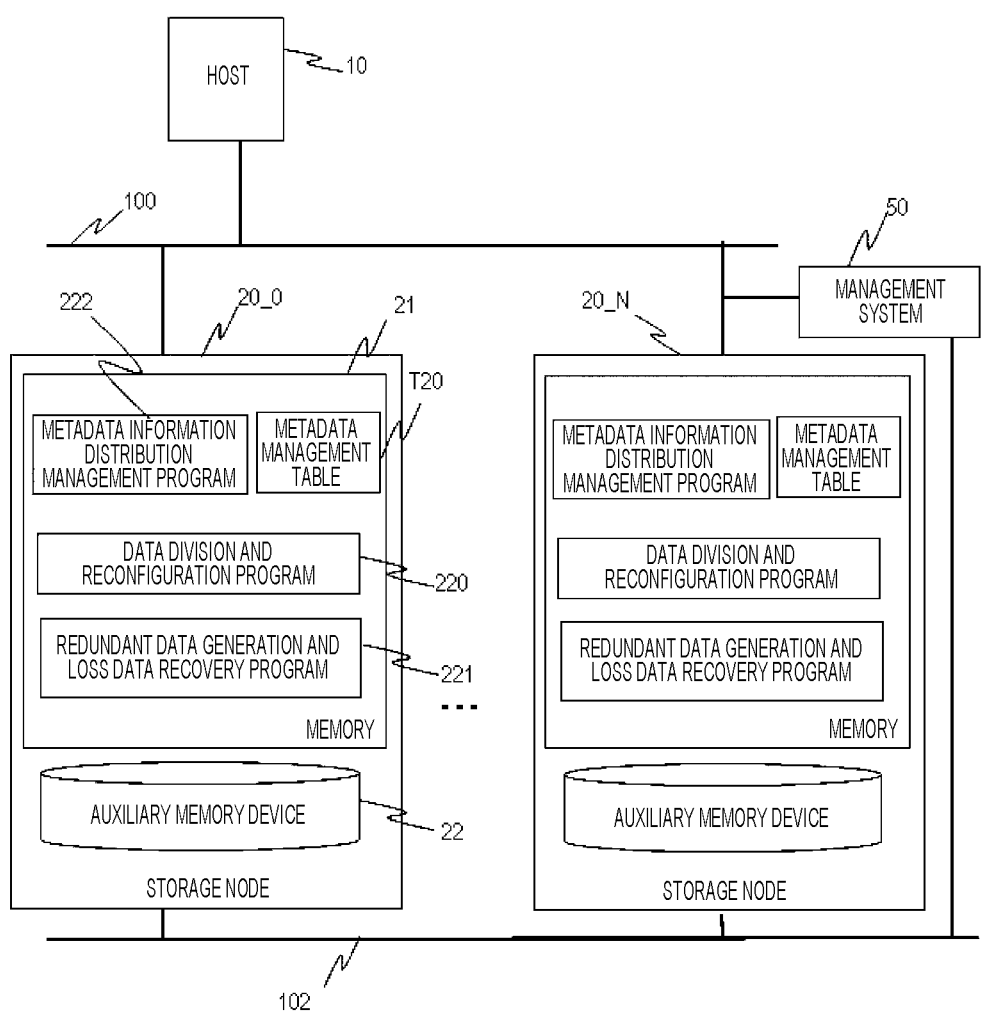
FIG. 3 illustrates the overview of a software configuration of a distributed storage system.

FIG. 3 illustrates an overview of a software configuration of the distributed storage system. In the example of FIG. 3, the storage nodes 20_0 to 20_N have similar software configurations. The memory 21 stores a data division and reconfiguration program 220, a redundant data generation and loss data recovery program 221, a metadata information distribution management program 222, and a metadata management table T20. These are loaded from, for example, the auxiliary memory device 22.

The metadata management table T20 indicates a storage-destination storage node of the host data block of the received data of the object and each of one or more redundant data blocks thereof. These are included in node configuration information of the object. Instead of the metadata management table T20, the metadata information distribution management program 222 may generate information necessary for determining the storage destination of each data block by calculation based on CRUSH or the like.

In one example, the metadata management tables T20 of the storage nodes 20_0 to 20_N distributedly manages the information according to the object ID. For example, the metadata information distribution management program 222 calculates one storage node ID from the object ID so as to acquire the node configuration information of the object that has received the data, and acquires the node configuration information for the object ID from the storage node. The distributed management reduces memory resources necessary for holding metadata information.

Instead of this, the metadata management table T20 of each storage node may store information of the entire objects. The metadata information distribution management program 222 may acquire the node configuration information for the object ID by calculation, without using the metadata management table T20.

The host 10 transmits write data of the object to the distributed storage system via the network 100. For example, the storage node 20_0 receives the write data. The metadata information distribution management program 222 acquires information corresponding to the object ID of the received data from the metadata management table T20 stored in any of the storage nodes.

The storage node 20_0 determines a plurality of storage nodes for storing the received data and the redundant data from the object ID, the offset, and the metadata of the received data. The node configuration information associated with the object ID indicates a plurality of storage node IDs which store object data (host data) and redundant data.

As described above, the storage node which stores the host data block is associated with a set of the object ID and the offset of the host data block. The storage node which stores the redundant data block is associated with only the object ID or a set of the object ID and the offset of the host data block. In addition, one storage node is defined to store the host data blocks of the plurality of objects or the redundant data blocks of the plurality of objects.

The data division and reconfiguration program 220 generates the host data block of the specified size from the received data. If necessary, dummy data is added. The redundant data generation and loss data recovery program 221 generates the redundant data from the generated host data block.

The data division and reconfiguration program 220 distributedly arranges each of the generated data blocks to the plurality of determined storage nodes via the network 102. Along with the host data block, address information including the object ID and offset thereof is transferred. The storage node which has received the data block transferred in the distributed arrangement returns a response and further stores the received data in the auxiliary memory device 22. After that, the data division and reconfiguration program 220 which has received the data from the host 10 returns a completion response to the host 10 via the network 100.

The metadata information distribution management program 222 updates management information of the object. The management information includes information of the metadata management table T22 and a distributed data management table T40 to be described later. The metadata information distribution management program 222 notifies update information to the storage node holding the management information of the object, and the metadata information distribution management program 222 of the storage node having received the notification performs the update (including the creation) of the table.

When the metadata information distribution management program 222 determines that distributedly arranged data necessary for starting the rearrangement process is stored, the metadata information distribution management program 222 starts the rearrangement process. The metadata information distribution management program 222 stores the host data blocks, of which the parity nodes are identical to each other and the local nodes are different from each other, as many as necessary for generating the redundant data (the number satisfying the specified condition), and then performs the rearrangement process. The redundant data is generated from a plurality of host data blocks of one or a plurality of objects.

As described above, the start of the rearrangement process may be a condition that the amount of data to be rearranged reaches a specified amount. In the rearrangement process, as in the example of FIG. 1B, the entire configuration nodes of the distributed arrangement may be performed only between the same objects.

The metadata information distribution management program 222 determines one or a plurality of objects to be rearranged, and notifies information of the determined object to the storage node associated with the corresponding object, specifically, the storage node storing the distributed host data or the distributed redundant data of the corresponding object, and the metadata information distribution management program 222 of the local node of the object.

The storage node which stores the distributed host data or the distributed redundant data of an object is the configuration node of the object in the distribution arrangement and is included in the metadata management table T20.

In each storage node which performs the rearrangement process, the redundant data generation and loss data recovery program 221 generates the redundant data for rearrangement from the host data block held in its own node. The data division and reconfiguration program 220 collectively transfers the host data blocks or the redundant data blocks to be rearranged for each storage node to each storage node through a single connection.

The data division and reconfiguration program 220 updates the object of the auxiliary memory device 22 with the host data received from another storage node (local node), or stores the redundant data in the auxiliary memory device 22 (parity node).

When the completion of the data transfer (data rearrangement) is confirmed by mutual notification between the entire related storage nodes of the object selected for the rearrangement, the data division and reconfiguration program 220 of each of the storage nodes related to the rearrangement updates the management information of each object having performed the rearrangement process through the metadata information distribution management program 222. The data division and reconfiguration program 220 deletes the distributedly arranged data which becomes unnecessary in the data rearrangement.

The mutual notification method between the distributed storages is, for example, as follows. (1) When a certain node completes the rearrangement process, the completion notification is transmitted to each related node. (2) For example, a main node (for example, a parity node) which performs state management of rearrangement is determined, and the main node manages a state. For example, when a certain node completes the rearrangement process, the completion notification is notified to the main node. When the main node receives the completion notification from the entire nodes related to the rearrangement, the main node notifies each node of an old data deletion command.

With this configuration, it is possible to perform data rearrangement while maintaining reliability and to realize performance improvement by the local read. The metadata information distribution management program 222 and the data division and reconfiguration program 220 may perform a rebalancing process according to the deletion and addition of storage nodes.

FIGS. 4A and 4B illustrate examples of the management information in the distributed storage system. FIG. 4A illustrates a configuration example of the metadata management table T20. The metadata management table T20 has an object ID column C2, a priority column C4, a configuration node column C6, a rearrangement process state column C7, and a division size column C8.

The object ID column C2 stores the object ID of the object managed by the table. When the metadata is distributedly managed, information on only a part of the objects stored by the system is stored in one metadata management table T20. The priority column C4 indicates the priority corresponding to the object ID (column C2). The priority is preset by a user through, for example, the management system 50.

The configuration node column C6 indicates information on storage nodes storing host data or redundant data in the distributed process of the object identified by the object ID (column C2) and information on each storage node storing object or redundant data after rearrangement. When the parity node is dependent on the offset, that information is also indicated.

The rearrangement process state column C7 indicates the rearrangement process state of the object identified by the object ID (column C2). The state is one of not yet, being rearranged, or completed. The state "not yet" indicates a state in which the rearrangement is not performed. The state "being rearranged" indicates that the rearrangement process is currently in progress. The state "completed" indicates a state in which the rearrangement process is completed. The rearrangement process state may be managed by using a bit map.

The division size column C8 indicates the division size when the object identified by the object ID (column C2) is distributedly arranged to a plurality of divided storage nodes. That is, it indicates the size of the host data block in the distribution process. Size 0 indicates undivided. When the division size of the object is a value selected from a plurality of specified values, the division size of the object may be managed by using a bit map.

FIG. 4B illustrates a configuration example of the distributed data management table T40. The distributed data management table T40 is created for each object in the rearrangement process and, for example, the assigned storage node of the object holds the distributed data management table T40 together with the metadata management table T20. The distributed data management table T40 holds management information of data being rearranged in the object.

The distributed data management table T40 has a range (LBA) column C22, a configuration node column C24, and a division size column C26. The range (LBA) column C22 indicates an address range (LBA) in the object of the data being rearranged. The configuration node column C24 indicates a storage node which stores the data being rearranged. The division size column C26 indicates a division size (host data block size) of the data being rearranged.

FIGS. 5A and 5B illustrate examples of management information in the distributed storage system. FIG. 5A illustrates a configuration example of a metadata structure T27 used in Embodiment 3. FIG. 5B illustrates a configuration example of a copy holding node management table T28 used in Embodiment 4. Details of the metadata structure T27 and the copy holding node management table T28 will be described in the corresponding embodiments.

Figure 6:
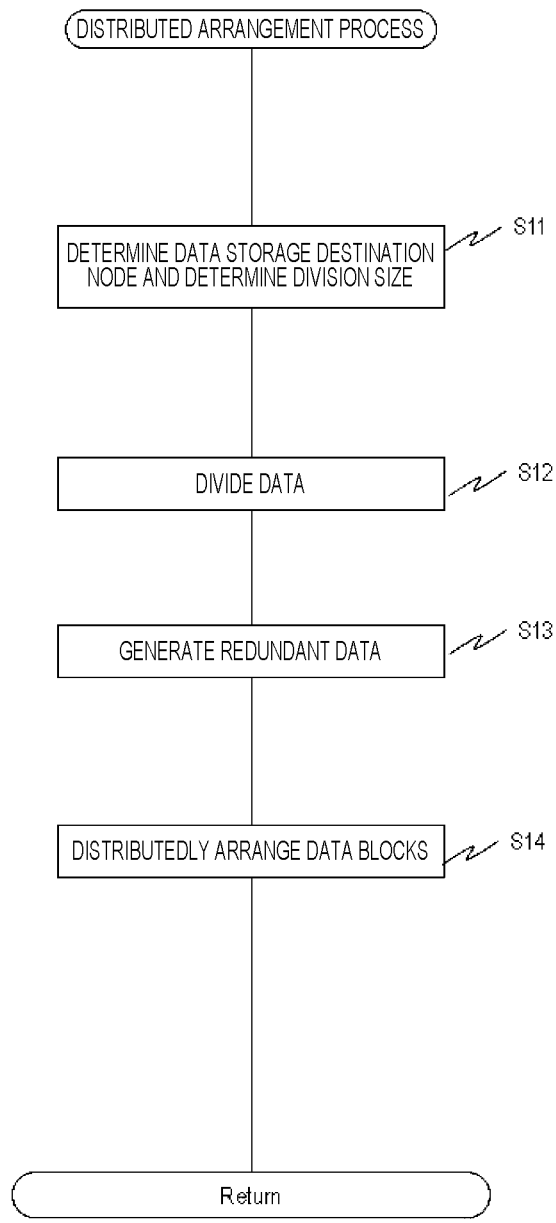
FIG. 6 illustrates a flowchart of an overview of a data storage process by one storage node.

FIG. 6 illustrates a flowchart of an overview of a data storage process by one storage node. The storage node distributedly stores data received from the host 10 in a plurality of nodes. The storage node which has received the data from the host 10 determines a storage destination node of the received data (S11).

Specifically, the metadata information distribution management program 222 specifies a storage node which stores management information including a metadata management table T20 of the object from an object ID of the received data. The metadata information distribution management program 222 acquires information of the configuration node and information on the division size in the distribution process from the specified storage node.

The metadata information distribution management program 222 determines the storage node which stores the host data and the redundant data from the acquired information. The metadata information distribution management program 222 may calculate the configuration node based on an algorithm such as CRUSH from the object ID of the received data.

When the division size is larger than the specified value and the rearrangement process is unnecessary, the metadata information distribution management program 222 sets the rearrangement processing state of the object of the received data as "completed", and if not, sets it as "not yet". The metadata information distribution management program 222 notifies the determination result of the rearrangement process state to the storage node holding the management information of the object. When the division size is large, there is often data within one division size for one read access, and the rearrangement for local read is unnecessary. The system load is reduced by omitting the rearrangement process. It may be determined that the rearrangement process is necessary, regardless of the division size.

The data division and reconfiguration program 220 divides the received data according to the division size of the object and generates a plurality of host data blocks (S12). The data division and reconfiguration program 220 adds dummy data as necessary to generate a data block, or adds a dummy data block. The number of generated host data blocks is an integer multiple of the number of data nodes in the redundant configuration.

Next, the redundant data generation and loss data recovery program 221 generates redundant data (S13). The redundant data generation and loss data recovery program 221 selects a specified number of host data blocks in the order of addresses, and generates a specified number (one or more) of redundant data blocks from them. The redundant data blocks are generated from host data blocks stored in different storage nodes.

The data division and reconfiguration program 220 distributedly arranges the host data blocks or the redundant data blocks to each of the storage destination nodes, which are configuration nodes of the object (S14). Specifically, the data division and reconfiguration program 220 transmits the data block to each corresponding storage node, and the transmission destination data division and reconfiguration program 220 stores the received data in the auxiliary memory device 22 and then returns the completion to the transmission source storage node.

Furthermore, when the rearrangement state of the object of the received data is "being rearranged", the metadata information distribution management program 222 of the storage node which has received the data from the host 10 performs the update (including creation) of the distributed data management table T40. Specifically, the metadata information distribution management program 222 transmits address information of the newly generated host data block and information of the storage destination node to the storage node which manages the distributed data management table T40 of the object. The transmission destination metadata information distribution management program 222 updates the distributed data management table T40 of the object according to the received information.

Figure 7:
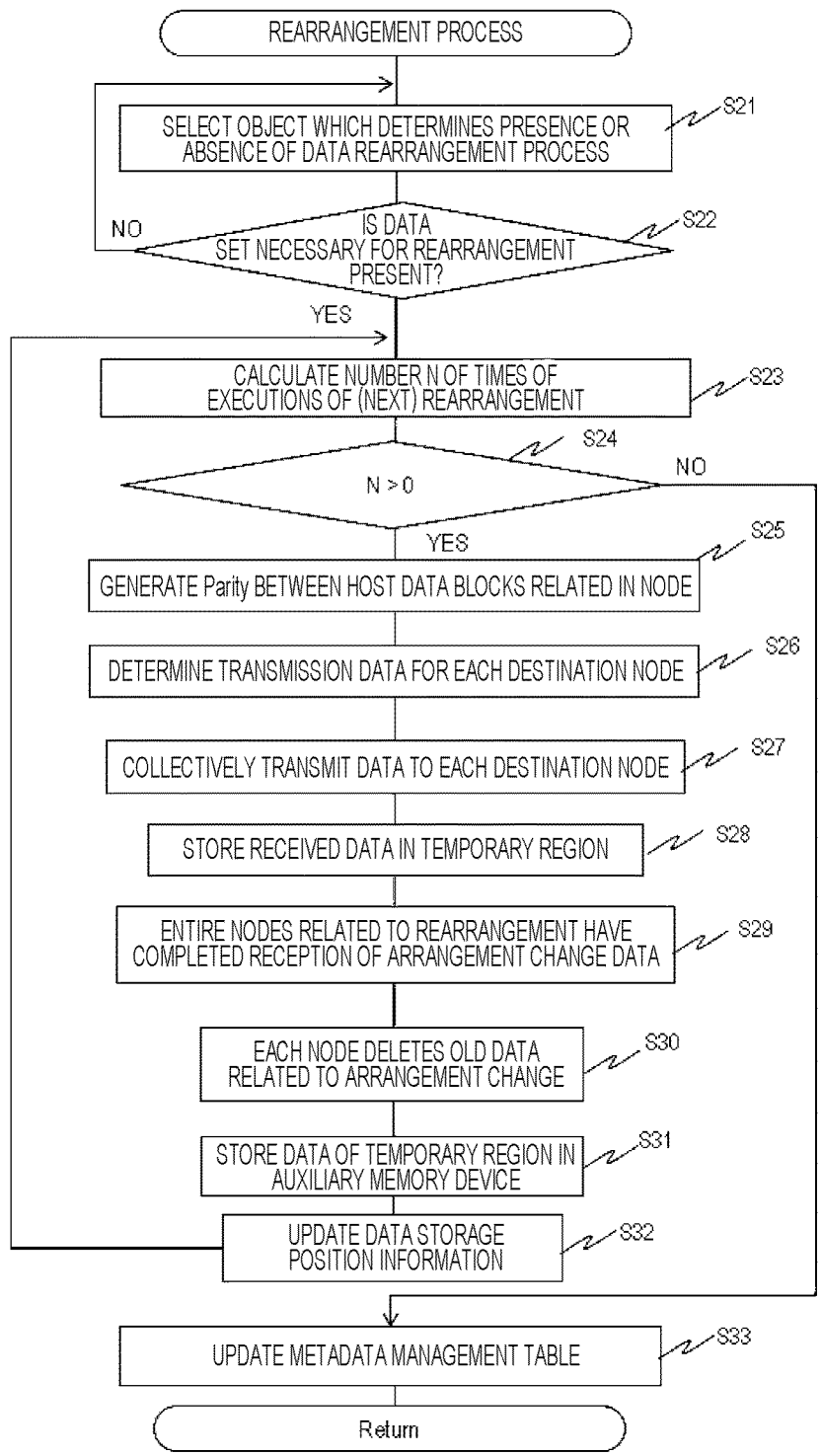
FIG. 7 illustrates a flowchart of an overview of a rearrangement process.

FIG. 7 illustrates a flowchart of an overview of a rearrangement process. FIG. 7 illustrates the process of one storage node. The metadata information distribution management program 222 determines a candidate for an object which performs data rearrangement (S21). For example, the metadata information distribution management program 222 selects the entire objects of the host data block held by the storage node.

Next, the metadata information distribution management program 222 determines whether a data set (host data block) necessary for data rearrangement of each selected object is present (S22). The host data block necessary for rearrangement is dependent on the redundant configuration and preset conditions. For example, the host data block necessary for rearrangement can generate redundant data, and is the host data block of a specified amount or more. The condition of the data amount may not be set.

The data host block necessary for generating redundant data is a set of the same parity node and a host data block of a different rearrangement destination node, and the number satisfies the number of data nodes in the redundant configuration. A set of objects for generating redundant data may be preset and an object for generating redundant data may be limited to an object having the same node configuration in distributed arrangement. For example, in the example of FIG. 1B, the redundant data may be generated within a set of A, B, C, E, F, and G objects.

When the host data block necessary for rearrangement of any object is not present (S22: NO), the metadata information distribution management program 222 waits for the host data block necessary for rearrangement to be prepared, and thus the flow returns to step S21. When the host data block for performing rearrangement of any object is held (S22: YES), the flow proceeds to step S23.

The metadata information distribution management program 222 calculates the number N of times to perform rearrangement in the current process flow for each object (S23). One rearrangement for one object is rearrangement of one stripe, and redundant data is generated from the host data block and stored in the plurality of local nodes and one or more parity nodes. The number of times to perform the rearrangement of the object is the maximum number of times to transmit the host data from the storage node to one local node of the object.

As described above, from the viewpoint of communication traffic, it is preferable that data blocks to be transmitted to the same storage node are collectively transmitted. However, there is a case where it is better not to rearrange the entire data to be rearranged in one rearrangement process. For example, this is a case where the size of the data to be rearranged is large, or a case where there are few physical resources (CPU, memory, network, I/O) which can be assigned for rearrangement.

For example, the metadata information distribution management program 222 determines the number of transmissions of the host data of each object according to preset conditions with reference to the state information such as the amount of transmission data and/or the current processing load.

For example, when the number of rearrangements of objects is large, it may take a lot of time when rearranged data is made valid after rearranging all data. The metadata information distribution management program 222 may determine whether any number N of times has reached a specified number (whether it is the specified number or more). The specified number is a value greater than 1 and may be 2. When the number N of times has reached the specified number, the distributed storage system may sequentially validate the data to be rearranged after transmission, before the rearrangement of the entire target data. For example, the metadata information distribution management program 222 transmits an instruction to validate the block together with the transmission of the host data block, and the local node follows the instruction.

The metadata information distribution management program 222 changes the rearrangement state of the object starting the rearrangement to "being rearranged" in the metadata management table T20. The notification is made from the node which has determined to perform the rearrangement to the management storage node holding the management information of the object to be rearranged.

The metadata information distribution management program 222 determines whether the number N of times of rearrangements of each object to be rearranged is greater than 0 (S24). When the number N of times of the entire objects is 0 (S34: NO), the flow proceeds to step S33. When the number N of times of any object is greater than 1, the flow proceeds to step S25.

The redundant data generation and loss data recovery program 221 creates redundant data from the host data block of the same or different objects stored in the storage node and satisfying the requirement for redundant data generation (S25).

The requirement for redundant data generation is dependent on the design. For example, the redundant code block is generated from a specified number of host data blocks, in which the parity nodes storing the generated redundant data are identical to each other and the local nodes stored after rearrangement are different from each other. It may be limited to a set of host data blocks of the same configuration node in the distributed arrangement, or redundant data may be generated only between predetermined objects.

The data division and reconfiguration program 220 determines transmission data for each destination node (S26), and collectively transmits the data to each destination node (S27). As described above, the amount of data to be collected may be determined according to the data size and processing load. The object data (host data) is transmitted to the local node, and the redundant data is transmitted to the parity node. The storage node having received the data stores the received data in a temporary region (S28). The temporary region may be on the memory 21, or may be a temporary storage region on the auxiliary memory device 22.

When the rearrangement of the generated redundant data and the host data which generated the redundant data is completed, the data division and reconfiguration program 220 notifies the completion to the related storage nodes, specifically, the configuration node (shown in the metadata management table T20) of each object that has performed the rearrangement. The data division and reconfiguration program 220 confirms that the entire storage nodes related to the rearrangement have completed reception of the rearranged data by notification from the entire storage nodes related to the rearrangement (S29), and then deletes the rearranged old data (S30). Therefore, the redundancy of data in the rearrangement process is maintained. The mutual notification method between the distributed storages is the same as described above.

The data division and reconfiguration program 220 stores the data stored in the temporary region in the region of the auxiliary memory device 22 (S31). The host data is stored in the storage position of the old data. This step is unnecessary when the temporary region is continuously used.

The data division and reconfiguration program 220 updates the distributed data management table T40 of each object that has performed rearrangement. The metadata information distribution management program 222 notifies the information of the rearranged data to the management storage node holding the distributed data management table T40 of the object, and the metadata information distribution management program 222 of the management storage node updates the data storage position information of the distributed data management table T40 of the object according to the received data (S32). The distributed data management table T40 in which the entire entries have been deleted is deleted. After that, the sequence returns to S23.

When the number of rearrangements of the entire objects is 0 in step S24 (S24: NO), the metadata information distribution management program 222 notifies the completion of the rearrangement to the management storage node holding the distributed data management table T40 of each object which has performed the rearrangement. Upon receiving the notification of completion of the rearrangement from the entire related nodes, the metadata information distribution management program 222 of the management node updates the information of the metadata management table T20 of the object (S33). The value of the rearrangement process state column C7 is updated with "completed". The mutual notification method between the distributed storages is the same as described above.

From the above process, object data is reconfigured from the host data block, and data protection by redundant data is performed between different objects.

Figure 8:
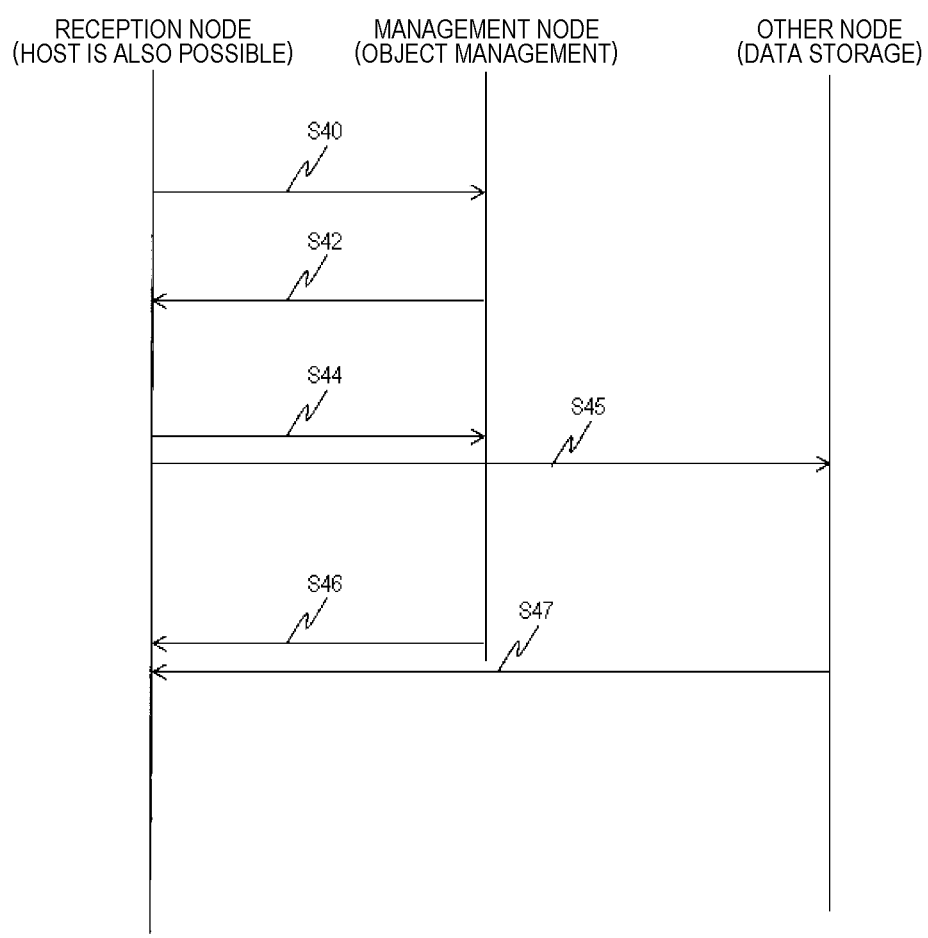
FIG. 8 illustrates a ladder chart of an overview of a data read process.

FIG. 8 illustrates a ladder chart of an overview of a data read process. The metadata information distribution management program 222 of the host 10 or the reception node which has received the read request determines the object ID from the read request and determines the management node holding the management information of the object. The reception node transfers the specified object and address of the read request to the management node and inquires the information of the storage destination of the specified address (S40).

The management node specifies the storage node which stores the data of the designated address, with reference to the distributed data management table T40 of the designated object and, if exists, the metadata management table T20. The management node returns the information of the specified storage node to the reception node (S42).

The reception node designates the object ID and the address to the specified storage node and requests the transmission of the data (S44, S45). The storage node which has received the data transmission request returns the data requested to the reception node (S45, S47). The reception node responds the data corresponding to the read request to the host 10, and the read process is completed. Since the data is stored in the specific local node by the rearrangement process, the number of inter-node transmissions and the amount of transmission data at the time of the read request are reduced, and the data read performance can be improved.

When node failure occurs, failure recovery is performed as follows. The metadata information distribution management program 222 determines the node which stores the data after the recovery process of the node in which the failure occurred. After that, in association with the redundant data generation and loss data recovery program 221, the data division and reconfiguration program 220 performs the acquisition of data and the recovery of data and stores the recovered data in the determined storage destination node. After that, the metadata information distribution management program 222 updates the storage destination node information and ends the failure recovery process.

Embodiment 2

In Embodiment 2, the overhead associated with the rearrangement process is reduced by selecting the object to which the data rearrangement process is applied. In the following, parts different from Embodiment 1 will be mainly described.

Figure 9A:
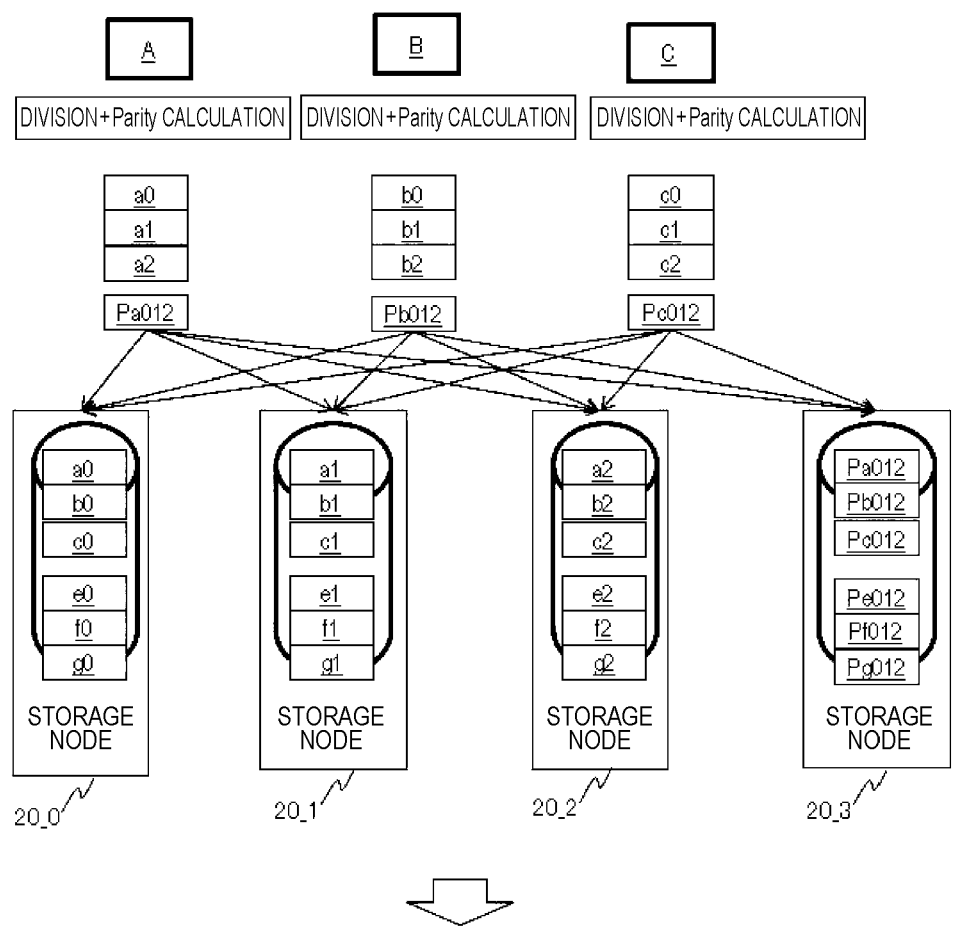
FIG. 9A illustrates the overview of Embodiment 2.
Figure 9B:
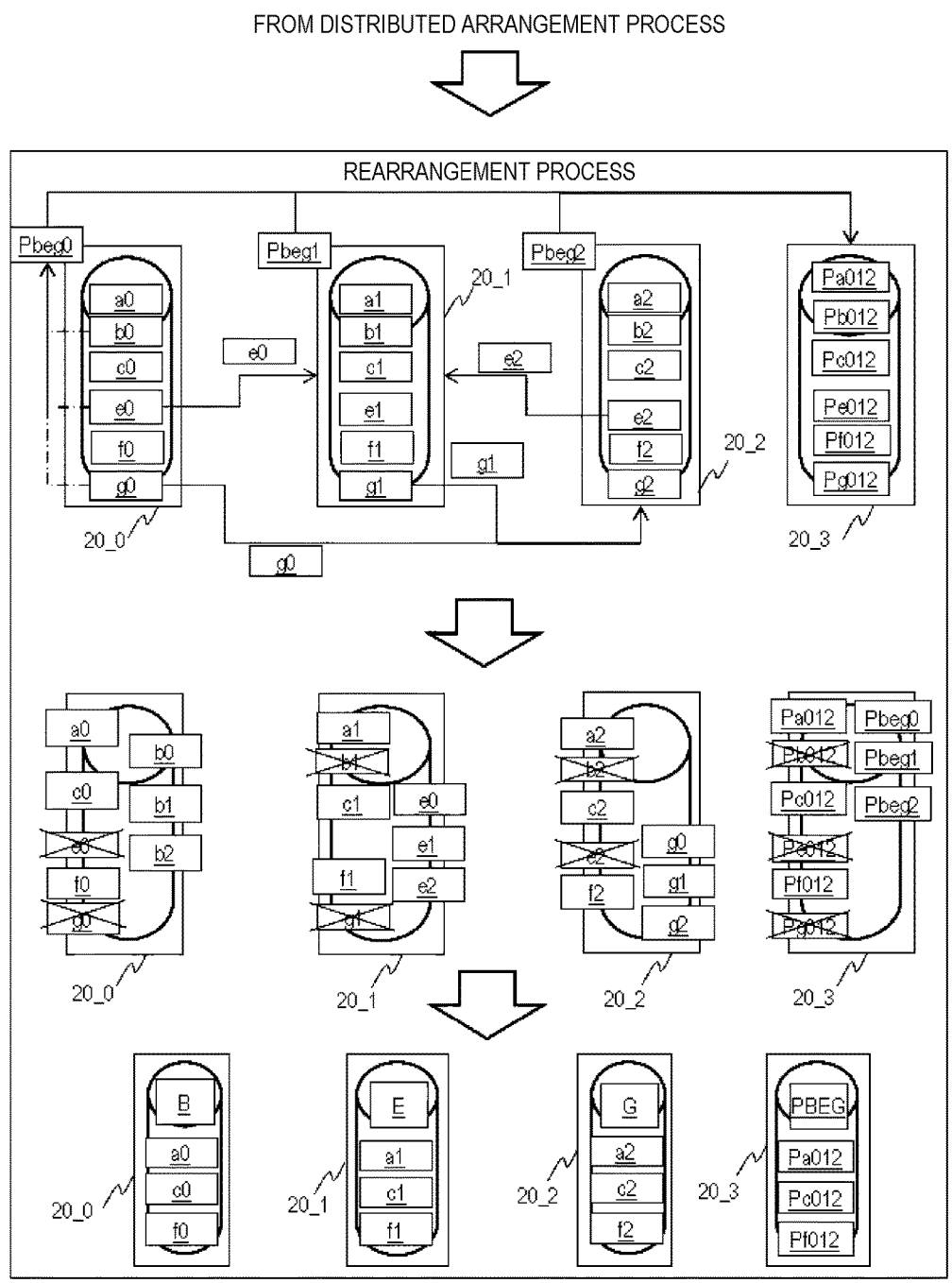
FIG. 9B illustrates the overview of Embodiment 2.

FIGS. 9A and 9B illustrate the overview of this embodiment. In this embodiment, objects on which the data reconfiguration process is performed are limited. In the example of FIG. 9, B, E, and G objects are selected as the target of the rearrangement process. Host data blocks of A, C, and F objects are not rearranged.

Figure 10:
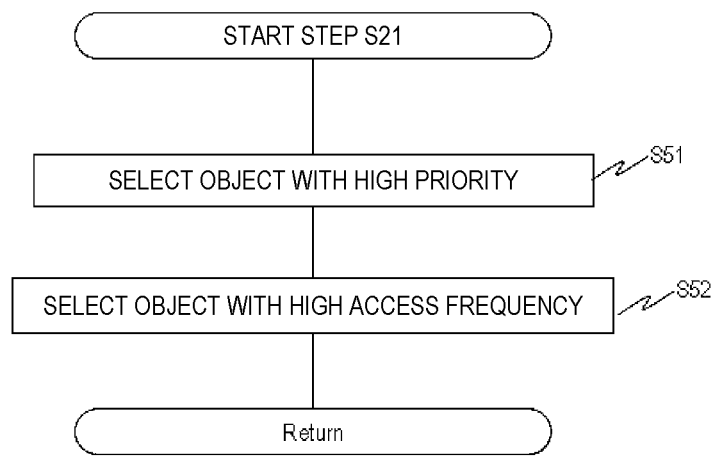
FIG. 10 illustrates a flowchart of details of step S21 in the flowchart of FIG. 7.

FIG. 10 illustrates a flowchart of details of step S21 in the flowchart of FIG. 7 in this embodiment. In step S21, a candidate for an object which performs data rearrangement is selected. In FIG. 10, the metadata information distribution management program 222 selects the object, in which the rearrangement process state is "not yet" and the priority is the highest, with reference to the priority column C4 of the metadata management table T20 and the rearrangement process state column C7 (S51). Other selection criteria by priority may be used. For example, the object, of which the priority has reached a specified level, may be selected.

The metadata information distribution management program 222 selects the object, in which the rearrangement process state is "not yet" and the access frequency exceeds a specified value (S52). The access frequency of the object is managed by, for example, the storage node which holds the management information of the object. Other selection criteria by the access frequency may be used. For example, the object with the highest access frequency may be selected.

When the range of high access frequency is limited to but the entire objects but a certain limited range in the object, only data of the address range with high access frequency may be selected as a rearrangement candidate. The object including the range is an object of the rearrangement candidate. The distributed storage system implements the following procedure.

(1) The rearrangement process state of the metadata management table T20 of the object is set to being rearranged.

(2) The rearrangement process of the target data is performed. The distributed data management table T40 is created and updated.

(3) Even after the rearrangement is completed, the rearrangement state of the metadata management table T20 is not changed and is maintained.

Therefore, even when the arrangement method is different for only a part of the objects, it may be managed by the distributed data management table T40. This process is particularly effective when the size of the object is very large and the rearrangement process of only a part of the data portion is necessary.

In this embodiment, the overhead associated with the rearrangement process is reduced by selecting the object or data in the object to which the data rearrangement process is applied. In addition, by selecting the candidate of the object which performs the rearrangement process based on the data priority or the access frequency, it is possible to efficiently perform the rearrangement process and realize the performance improvement.

Embodiment 3

In Embodiment 3, the storage node has an additional write function of additionally writing the write data (update data), without deleting old data, and managing data update with metadata. When update data for distributedly arranged data is received, the distributed storage system improves write performance by generation of redundant data by full stripe and distributed arrangement (full stripe write).

Figure 11:
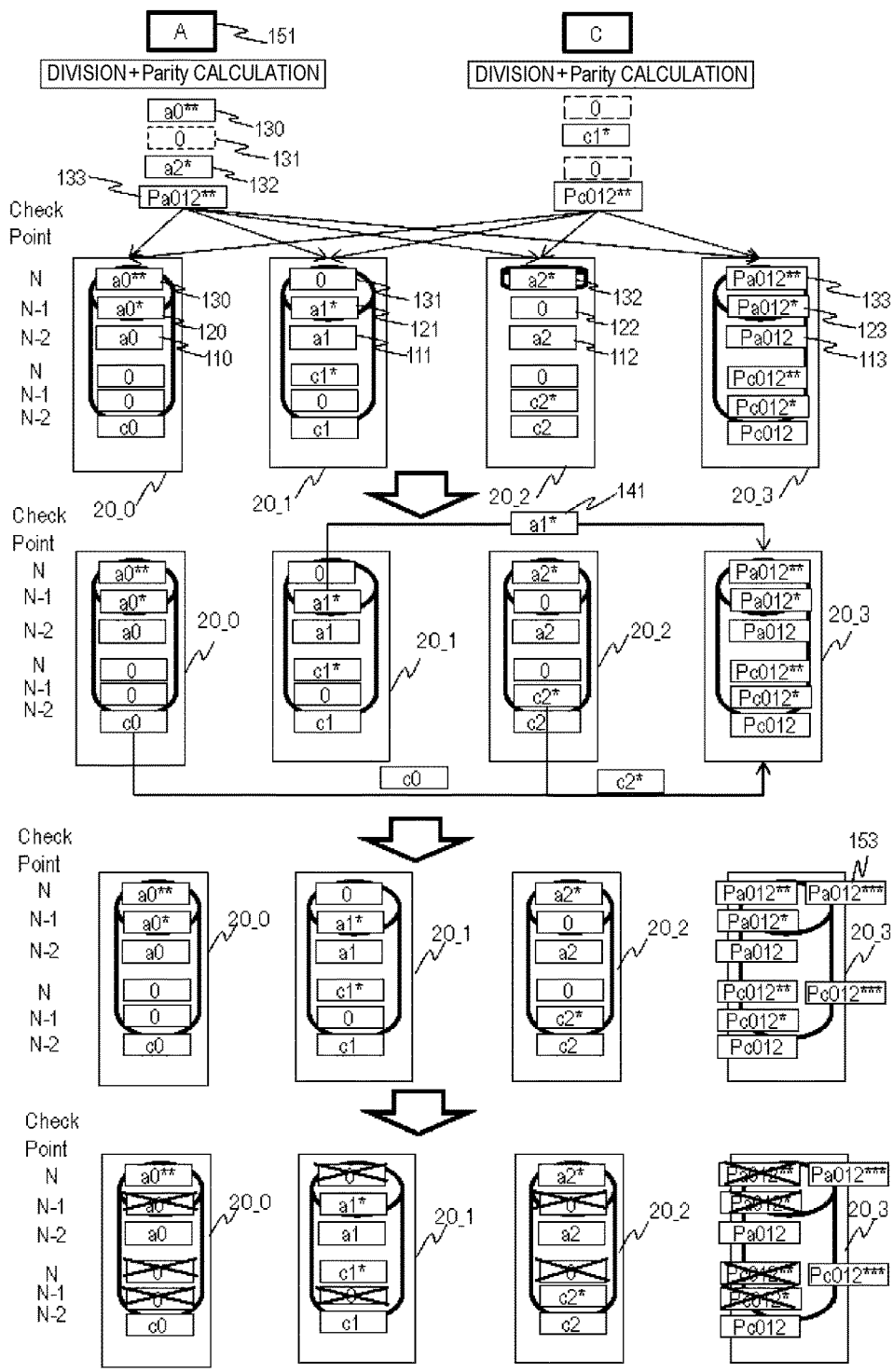
FIG. 11 illustrates the overview of Embodiment 3.

FIG. 11 illustrates the overview of this embodiment. Normally, when a partial update occurs in a stripe of a redundant configuration, it is necessary to update the old and new data and the parity associated with the updated portion. Therefore, network communication between the storage nodes occurs whenever the data block is transferred, and write performance deteriorates.

When the write data is received, the distributed storage system of this embodiment assumes that another data constituting the stripe is 0 data (an example of dummy data) and performs full stripe write.

In FIG. 11, the received data 151 of the A object consists of a a0** update data block 130 and a a2* update data block 132. When the received data 151 does not satisfy the number of nodes to be distributed, the 0 data block 131 is assumed, and the Pa012** redundant data block 133 is generated from the data blocks 130, 131, and 132.

The 0 data block used for generating the redundant data is not transferred to the assigned storage node, and only the fact that the 0 data is newly written to the assigned storage node is notified. In FIG. 11, for example, the storage node 20_0 does not transfer the 0 data block 131 to the storage node 20_1, but notifies that the 0 data has been written to the corresponding address.

The assigned storage node 20_1 updates only the metadata of the corresponding address. The 0 data in this process is temporarily used for filling to realize the full stripe write. Each storage node does not actually store the 0 data in the storage region but manages that it is a temporary 0 region in the metadata managing a user data position by using a bit flag or the like.

Data consistency is maintained by a log write of a storage node. The log write additionally writes update data and update metadata. The update time point at which the additional write is performed is referred to as a check point. In the log write, update data of a part or all of the check points selected from past check points is saved as a snapshot. Therefore, the snapshot of the update data is automatically and continuously generated. When a new check point is set, the log write increments a check point number which identifies the check point.

When the data is updated, the log write does not overwrite the update data on the data on the memory media corresponding to the update portion of the data, and writes the update data to another region on the memory media region. Therefore, data at an arbitrary check point can be restored.

In the example of FIG. 11, at the check point N−2 of the A object, the distributed storage system distributedly arranges the a0 update data block 110, the a1 update data block 111, the a2 update data block 112, and the Pa012 redundant data block 113 to the storage nodes 20_0 to 20_3.

At the check point N−1, the a0* update data block 120 and the a1* update data block 121, which are update data of the a0 data block 110 and the a1 data block 111, are written from the host. The distributed storage system assumes that the 0 data block 122 has been written, and creates the Pa012* redundant data block 123 from the data blocks 120, 121, and 122.

The distributed storage system stores the data blocks 120, 121, and 123 in the storage nodes 20_0, 20_1, and 20_3. The distributed storage system assumes that the 0 data block 122 has been written to the storage node 20_2.

At the check point N, the a0** update data block 130 and the a2* update data block 132 are written from the host. The distributed storage system assumes that the 0 data block 131 has been written, and creates the Pa012** redundant data block 133 from the data blocks 130, 131, and 132.

The distributed storage system stores the data blocks 130, 132, and 133 in the storage nodes 20_0, 20_2, and 20_3. The distributed storage system assumes that the 0 data block 131 has been written to the storage node 20_1.

After that, the distributed storage system asynchronously regenerates the redundant data from the latest data (a0** data block 130, a1 data block 121, a2* data block 132).

Here, an example in which the check point number X for performing this asynchronous process is 2 from the previous check point at which the redundant data was generated from the latest data is described.

The check point N−2 is a check point at which the redundant data was generated from the previous latest data. Therefore, the check points N−1 and N are the targets for generating the redundant data. In the A object, the storage node 20_1 transfers a copy 141 of the a1* data block to the storage node 20_3 so as to update Pa012** of the storage node 20_3 in the a1* data block of the check point N_1.

The Pa012*** redundant data block 153 is redundant data generated from the a1* data block 141 and the Pa012 redundant data block 133. The distributed storage system generates a Pa012* redundant data block 153, writes the Pa012*** redundant data block 153 to the auxiliary memory device 22, and deletes unnecessary data related to the check points N−1 and N. With the above procedure, the redundant data of the latest data can be regenerated while maintaining reliability. The distributed storage system performs the same process as that of the A object with respect to the C object.

As described above, when the update data is distributedly arranged, the distributed storage system of this embodiment assumes that missing data for constituting the stripe is 0 data, and performs the full stripe write. After that, in the asynchronous process, the distributed storage system generates redundant data of the latest data, thereby reducing data communication between the storage nodes accompanying the update of the redundant data and improving the performance.

Figure 12:
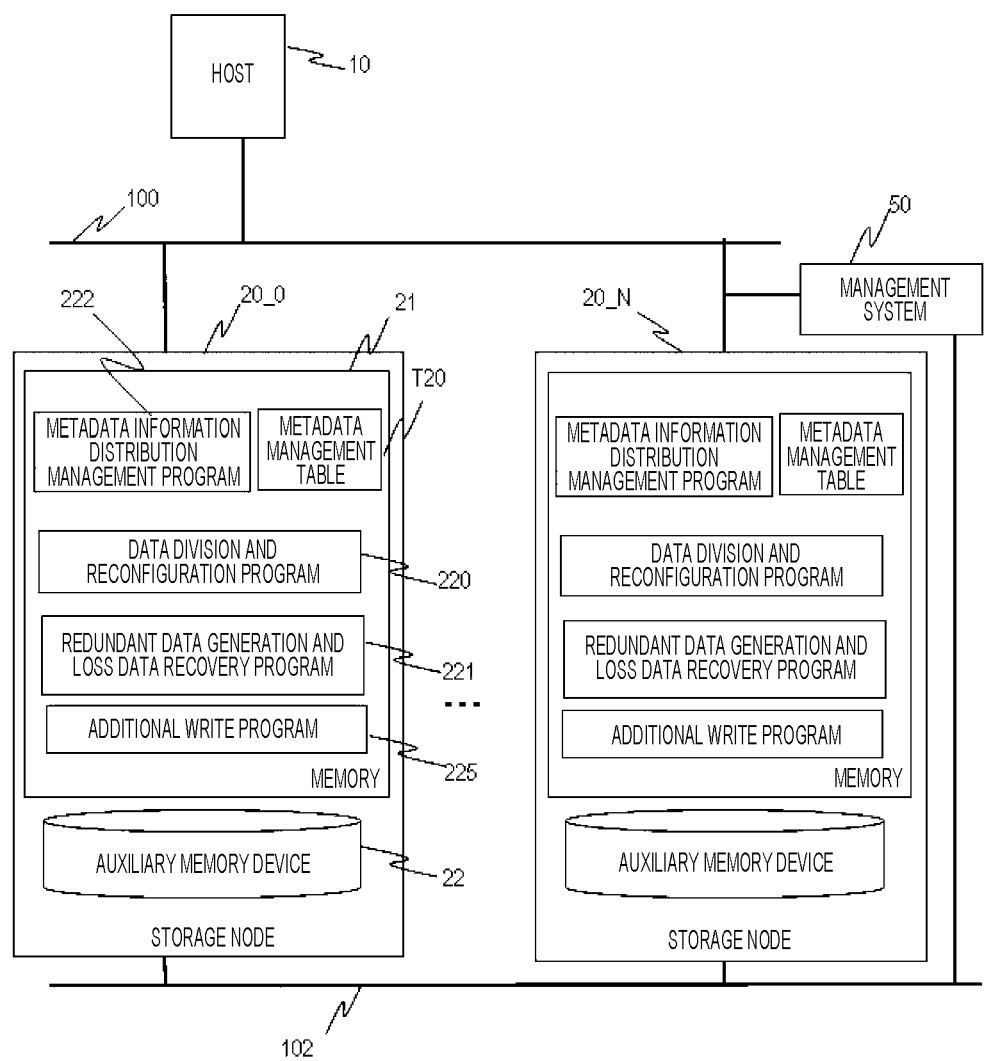
FIG. 12 illustrates the overview of a software configuration of a distributed storage system.

FIG. 12 illustrates an overview of a software configuration of the distributed storage system in this embodiment. The difference from Embodiment 1 and Embodiment 2 is the additional write program 225. The additional write program 225 performs the additional write when writing data to the storage device.

Here, an additional write metadata structure T27 in FIG. 5A is metadata for managing a data additional write address in the additional write program 225. The additional write metadata structure T27 is prepared for each storage node and held. The additional write metadata structure T27 has a check point number column C46, a flag column C47, and an address column C48.

The check point number column C46 stores the check point number at the time of writing the data. The flag column C47 stores a bit map indicating whether it is a zero region, a sparse region, a temporary write, or the like. The zero region is a region in which the data is zero, and actually, data need not be written with zero data. The sparse region is a region in which no data is written. The temporary write region is the same as described above. The address column C48 stores the address at which the data is written.

For example, for the region in which 0 data is stored for the full stripe write, the flag column C47 indicates a temporary write flag and a zero region flag. In addition, the address column C48 holds the address before temporary write by 0 filling. The temporary write and the zero region flag are a bit flag for determining whether it is the latest data at the time of the asynchronous write process, and zero data has not been actually written. Therefore, the address column C48 holds the address before the temporary write by 0 filling and maintains the data consistency.

The difference from Embodiment 1 will be mainly described below. In the redundant data generation step S13 of the distributed arrangement process of FIG. 6, the additional write program 225 determines whether temporary 0 data is necessary so as to generate redundant data, and adds 0 data if necessary to generate redundant data. In the data block distribution arrangement step S14, the additional write program 225 notifies the storage node assigned to the temporary region of 0 data of the information of 0 data.

Figure 13:
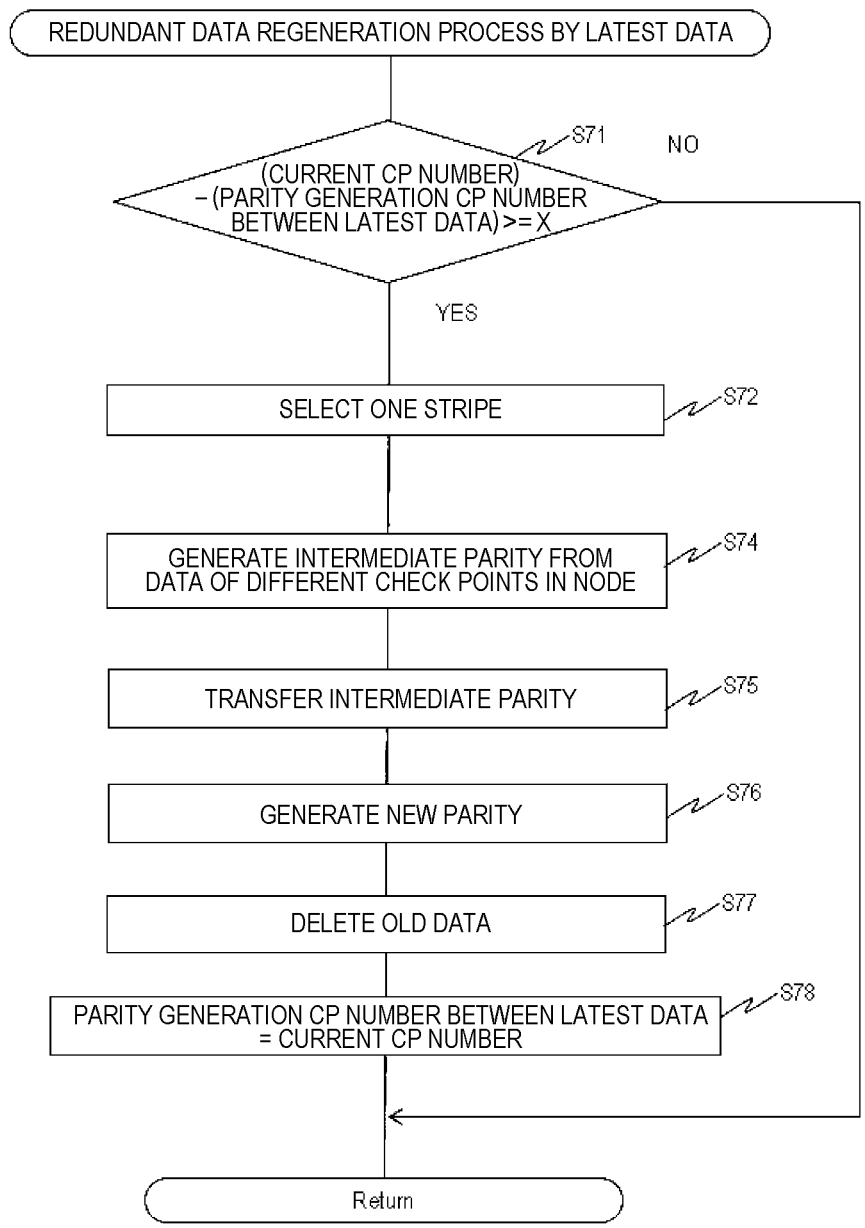
FIG. 13 illustrates a flowchart of an overview of a redundant data regeneration process based on latest data to be asynchronously performed.

FIG. 13 illustrates a flowchart of an overview of a redundant data regeneration process based on latest data to be asynchronously performed. The additional write program 225 of each storage node holding the host data block determines whether a difference between a current check point (CP) number and a CP number on which redundant data generation is completed between the latest data at that time has reached a check point number X for performing the asynchronous process (S71).

X is a tuning parameter and is preset from, for example, the management system 50. As X is larger, the number of times the asynchronous process runs is reduced and the system load is reduced. On the other hand, a period during which the system temporarily holds the 0 filling information becomes longer. X may be dynamically changed so that the redundant data regeneration process is performed when the system load or network load is light. When the redundant data regeneration process is performed immediately, the value of X is set to 0.

When the determination result in step S71 is NO, the additional write program 225 does not perform the asynchronous process. When the determination result in step S71 is YES, the additional write program 225 proceeds to step S72.

The additional write program 225 of the parity node selects one stripe (check point) within a plurality of check points holding the stripes in a temporary written state, and determines the check point number thereof (S72). The determined stripe is notified to the related data node. For example, the additional write program 225 selects a stripe string in which inter-node data movement is minimized for updating to the latest redundant data. In this example, the stripe holding the greatest number of latest data blocks in the stripe is selected. Therefore, network data transmission accompanying redundant data update is minimized.

The additional write programs 225 of some data nodes generate intermediate redundant data (S74). This step is performed by the data node which does not include the latest host data block in the selected stripe.

The additional write program 225 selects the data block for updating the redundant data from the host data blocks of different check points. The additional write program 225 selects the latest host data block and the host data block in the selected stripe. When the host data block in the selected stripe is 0 data, only the latest data block is selected.

The redundant data generation and loss data recovery program 221 generates intermediate redundant data from the selected host data block (S74). When the host data block in the selected stripe is 0 data, the intermediate redundant data is the latest host data block. The data division and reconfiguration program 220 transfers the intermediate redundant data to the parity node (S75).

In the parity node, when the transferred intermediate redundant data is received, the data division and reconfiguration program 220 interworks with the redundant data generation and loss data recovery program 221 to generate new redundant data from the intermediate redundant data and the redundant data of the stripe determined in step S72 (S76). When the new redundant data is written to new LBA, each additional write program 225 of the stripe deletes the old host data which became unnecessary (S77). Each additional write program 225 of the stripe updates a latest data-to-data redundant data generation CP number with a current CP number in the additional write metadata structure T27, and completes the process.

Furthermore, it is possible to combine the redundant data regeneration process based on the latest data illustrated in FIG. 13 and the rearrangement process illustrated in FIG. 7. For example, it is assumed that each storage node performs an additional write process of update data. In step S25 of FIG. 7, each storage node selects the latest data when redundant data is generated between the related host data blocks. Since the update of the redundant data is also completed by the rearrangement process, the redundant data regeneration process based on the latest data illustrated in FIG. 13 is also completed.

As described above, in this embodiment, when the update data is distributedly arranged, the full stripe write is performed on the assumption that the perforated data constituting the stripe is 0 filling data, and thereafter, the latest update data is reflected to the redundant data in the asynchronous process. Furthermore, this process is combined with the rearrangement process illustrated in Embodiment 1 or 2. Therefore, inter-node data communication accompanying the update of redundant data is reduced and performance is improved.

Embodiment 4

In this embodiment, an example in which an application program (application) or a virtual machine (VM) is arranged in a storage node holding copy data of an object rearrangement destination storage node or an object and a data copy method performed when it is not assigned to these nodes will be described.

Figure 14:
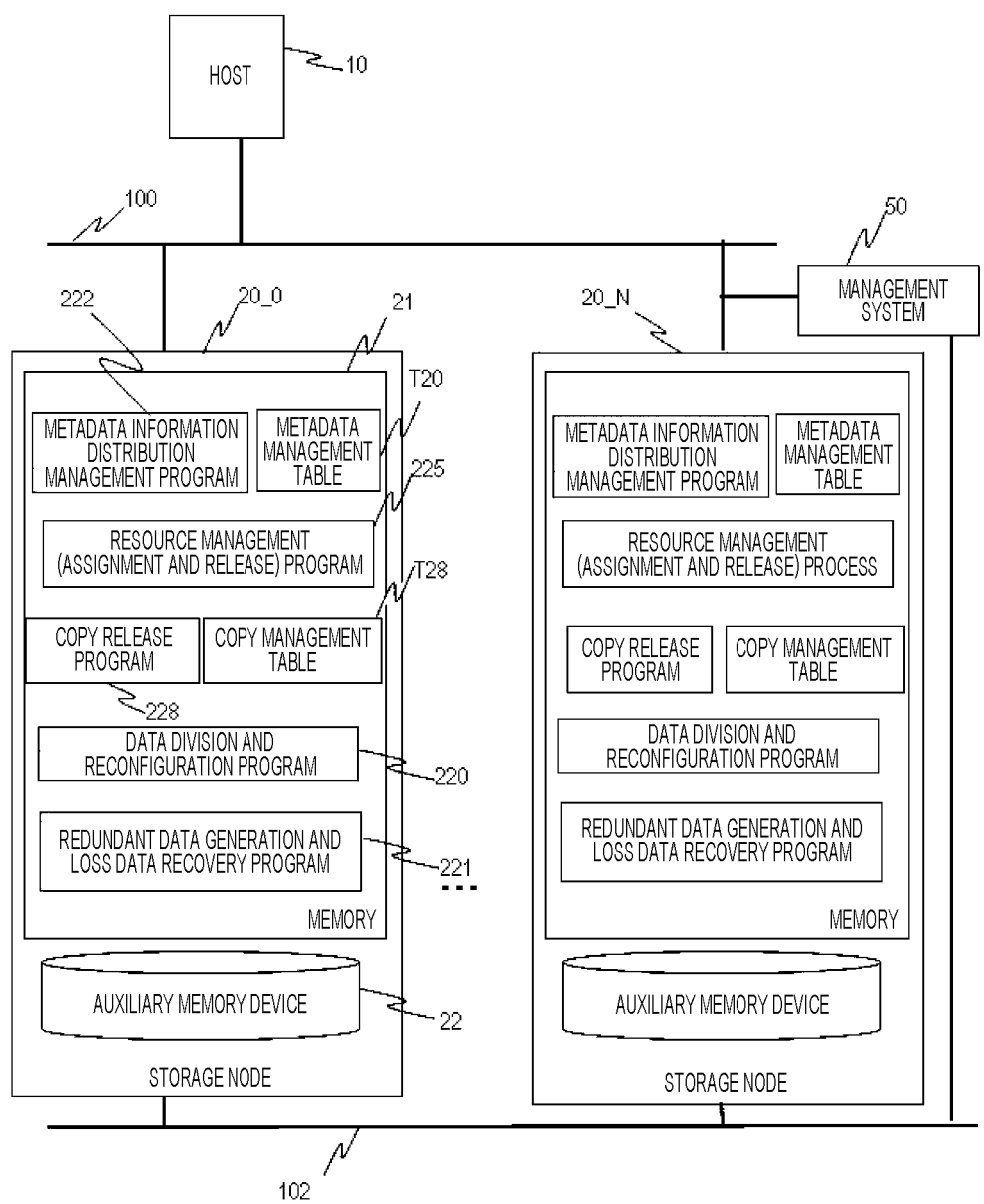
FIG. 14 illustrates a system configuration diagram when assigning an application program/virtual machine in Embodiment 4.

The storage node which performs the application/VM can be dynamically assigned. For example, the application/VM may be assigned to the node holding data, or may be assigned to other nodes. FIG. 14 illustrates a system configuration diagram when assigning an application/VM. As the difference from Embodiment 1, each storage node holds a resource management (assignment and release) program 225, a copy release program 228, and a copy holding node management table T28.

When the application/VM is arranged before performing the rearrangement process, the application/VM acquires the divided data distributed to the plurality of storage nodes via the internal network 102 and reconfigures an original object or a part thereof. This means holding the copy of the original object or the part thereof.

Therefore, as an example, the local node to which the application/VM is assigned selects the local node of data used by the application/VM. The distributed data rearrangement process uses the presence of the object reconfigured by the application/VM.

In steps S26 to S31 in FIG. 7, data movement for rearrangement is performed except for the data reconfigured by the application/VM. In this method, the reconfigured data is managed in the copy holding node management table. That is, when the copy of data is created, information of the copy holding node is registered in the copy holding node management table, and when the rearrangement process is performed, the copy holding node management table is referred to and used. Therefore, the amount of inter-node network communication data accompanying the rearrangement process is reduced. In addition, when copy data already exists, the application/VM is assigned to the copy data holding node and performance improvement is aimed by not moving the data.

FIG. 5B illustrates the copy holding node management table T28. The copy holding node management table T28 is created for each object holding the copy and, for example, the assigned storage node of the object holds the copy holding node management table T28 together with the metadata management table T20. The copy holding node management table T28 holds copy holding nodes in units of data blocks in the object.

The copy holding node management table T28 has a range (LBA) column C42 and a copy destination configuration node column C44. The range (LBA) column C42 indicates the address range (LBA) of the data block copied to other nodes. The copy destination configuration node column C44 indicates the storage node holding the copy of the data block.

When the application/VM is assigned, the distributed storage system preferentially assigns the application/VM to the storage node at which the copy exists by referring to the copy holding node management table T28, and aims to improve the performance by the local read.

It is considered that the application/VM is assigned to the storage node at which the copy does not exist. For example, there are few resources such as CPU and memory of nodes holding data and the copy thereof.

In this case, after the application/VM is assigned, the data is copied according to the access of the application/VM to the node to which the application/VM is assigned from the data holding node. In the data copying method, data copy ranges (addresses) different for each node holding the existing copy data are determined and data copy is performed. Therefore, the data copy is performed at high speed. In the data copy process, data of a high priority object may be preferentially copied.

Figure 15:
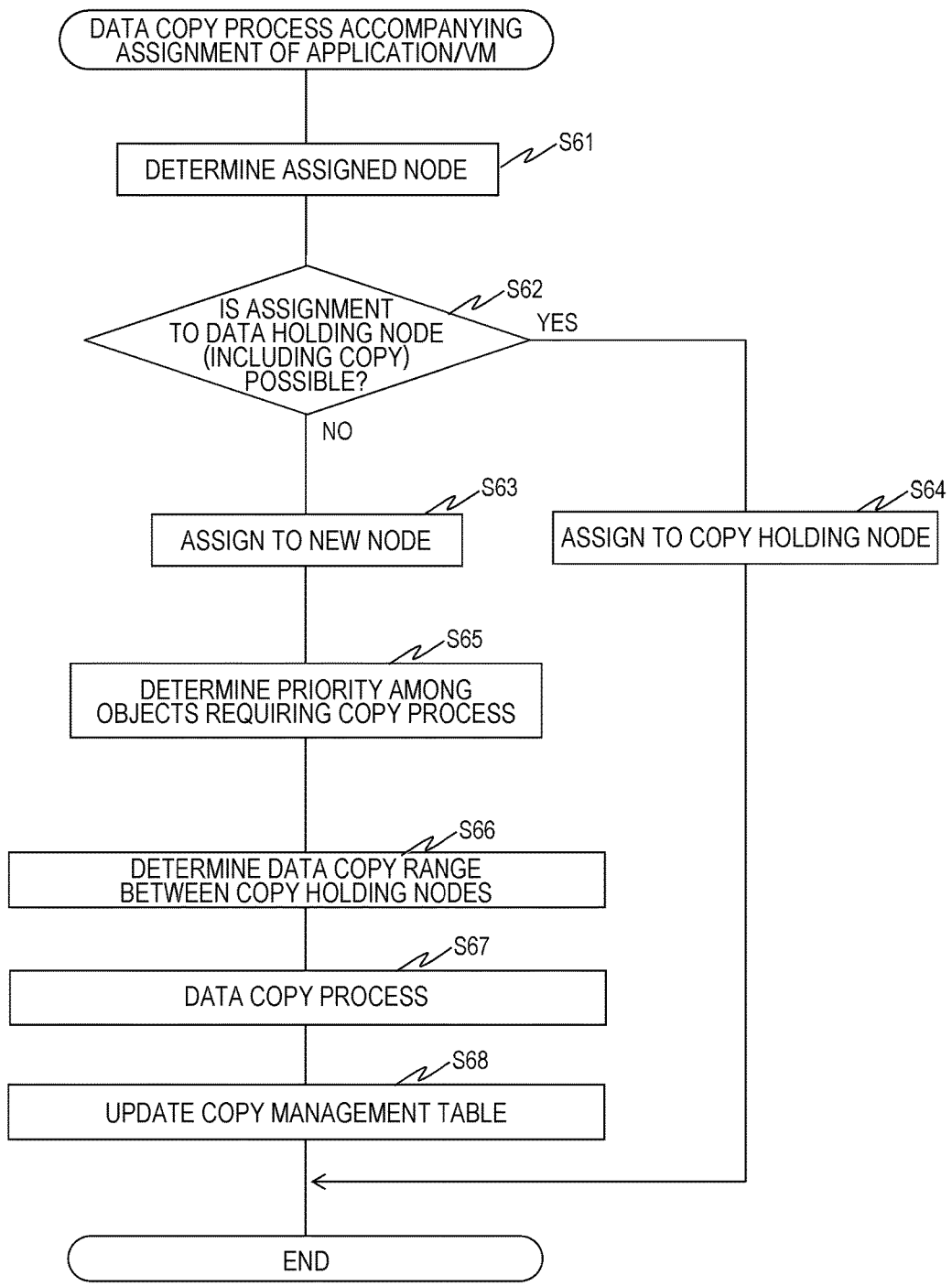
FIG. 15 illustrates a flowchart of an overview of a data copy process accompanying the assignment of the application program/virtual machine.

FIG. 15 illustrates a flowchart of an overview of the data copy process accompanying the assignment of the application/VM. In response to the node assignment request of the application/VM, the resource management (assignment and release) programs 225 of the plurality of storage nodes interwork with each other to determine the assigned node (S61). When the highest priority of the selection of the assigned node is the local node and it is determined that the assignment to the local node is inappropriate, other storage nodes are selected.

For example, when there is no margin for the resource of the local node, another storage is selected. The selected other storage node is a storage node having a margin in resources. The resources are, for example, CPU, memory, and/or communication interfaces, and the selection is based on a comparison result between a use rate and a threshold value. The assignment request includes information on the object referred to by the application/VM.

The resource management (assignment and release) program 225 of the node having received the application/VM assignment request confirms whether the application/VM assignment destination node is the data holding node including the copy by using the copy holding node management table T28 (S62). When the confirmation result in step S62 is YES, the resource management (assignment and release) program 225 assigns the application/VM to the copy holding node (S64) and ends the process.

When the confirmation result in step S62 is NO, the resource management (assignment and release) program 225 assigns the application/VM to the new node (S63), and determines the priority among objects requiring the copy process by referring to the metadata management table T20 (S65).

The copy release program 228 determines the data copy range while considering the resource usage status and/or the network load between the copy holding nodes for each data block that needs to be copied (S66). For example, the ratio of each storage node is determined from the CPU utilization, memory usage, and/or network load of each storage node. According to this ratio, the data copy range (copy data amount) of each storage node is determined.

For example, when there are three data copy holding nodes and the ratio between them is determined to be 3:2:1, the data copy range (address range) is determined to be a ratio of 3:2:1. After that, the copy release program 228 performs the data copy process (S67).

Finally, the copy release program 228 adds a new node to the object ID in the copy holding node management table T28 and ends the process. The copy release program 228 deletes the copy data by using an algorithm such as LRU. At this time, when the node ID is deleted from the copy holding node management table T28 and the entire copies disappear, the entry of the object ID is deleted first, and then the data is deleted.

According to this embodiment, the assignment of the application/VM is arranged to the node on which the rearrangement process has been performed or the storage node which holds the copy data, and furthermore, when it is not assigned to the storage node, the data copy range is determined from the copy holding node and the data copy is performed. Furthermore, performance degradation of high priority object is avoided by considering the priority of each object.

In addition, taking into consideration data copy at the time of data rearrangement, the network load at high reliability data rearrangement is avoided by stopping data movement at the time of rearrangement of highly reliable data of copy data. Therefore, the read performance of the application/VM is improved.

The present invention is not limited to the above-described embodiments and various modifications can be made thereto. For example, the embodiments have been described in detail for easy understanding of the present invention and are not intended to limit to those necessarily including all the above-described configurations. In addition, a part of a configuration of a certain embodiment can be replaced with a configuration of another embodiment, and a configuration of another embodiment can be added to a configuration of a certain embodiment. In addition, it is possible to add, remove, or replace another configuration with respect to a part of a configuration of each embodiment.

All or part of the above-described configurations, functions, processing units, processing means, and the like may be realized by hardware, for example, design of integrated circuits or the like. In addition, each of the above-described configurations, functions, and the like may be realized by software which causes a processor to interpret and execute a program that realizes each function. Information of the programs, the tables, the files, and the like that realize each function can be stored in a memory device such as a memory, a hard disk, a solid state drive (SSD), or a recording medium such as an IC card, or an SD card. In addition, control lines or information lines indicate what is considered to be necessary for the description, and all the control lines or information lines are not necessarily illustrated on products. In practice, it can be considered that almost all the structures are mutually connected.

The invention claimed is:

1. A storage system including a plurality of storage nodes connected via a network, the storage system comprising: a first storage node, a second storage node, and a third storage node, wherein the first storage node receives write data of an object, the first storage node generates a plurality of distributedly arranged write data blocks from the write data and generates a first redundant data block from the plurality of distributedly arranged write data blocks, the first storage node transmits each of the plurality of distributedly arranged write data blocks and the first redundant data block to different storage nodes, the different storage nodes comprise the second storage node and the third storage node, and an arrangement destination of the first redundant data block is the third storage node, the second storage node selects a plurality of distributedly arranged write data blocks from distributedly arranged write data blocks held therein, and rearrangement destination storage nodes of the plurality of selected distributedly arranged write data blocks are different from one another, the second storage node generates a second redundant data block from the plurality of selected distributedly arranged write data blocks, and the second storage node rearranges each of the plurality of selected distributedly arranged write data blocks to the rearrangement destination storage node and further arranges the second redundant data block to a storage node other than the rearrangement destination storage node, so that the write data of the object received by the first storage node is rearranged to any one of the plurality of storage nodes.

2. The storage system according to claim 1, wherein the first storage node determines the different storage nodes based on an identifier of the object, and the second storage node determines the rearrangement destination storage node and the storage node at which the second redundant data block is arranged, based on an identifier of an object of each of the plurality of selected distributedly arranged write data blocks.

3. The storage system according to claim 2, wherein the different storage nodes are previously associated with an object group consisting of a plurality of objects.

4. The storage system according to claim 1, wherein a storage node holding a distributedly arranged data block deletes the distributedly arranged data block after the distributedly arranged data block is rearranged and the redundant data block generated from the distributedly arranged data block is arranged.

5. The storage system according to claim 1, wherein the second storage node transmits a plurality of write data blocks to be transmitted to the same storage node at a time.

6. The storage system according to claim 1, wherein the second storage node performs the rearrangement on a write data block of one or a plurality of objects selected based on a predetermined priority of an object.

7. The storage system according to claim 1, wherein the second storage node performs the rearrangement on a write data block of one or a plurality of objects selected based on an access frequency of an object.

8. The storage system according to claim 1,
wherein each of the plurality of storage nodes additionally writes update data without deleting old data, and manages data update by metadata,
wherein the first storage node receives update data of the received write data,
the first storage node generates a plurality of update write data blocks from the update data without deleting the write data, and generates a third redundant data block from the plurality of update write data blocks,
the first storage node arranges the third redundant data block in the third storage node,
the first storage node arranges each of the update write data blocks in a storage node other than the third storage node in the different storage nodes, and
the third storage node updates the third redundant data block with intermediate redundant data generated from latest write data received from at least a part of the different storage nodes to generate a latest redundant data block.

9. The storage system according to claim 8,
wherein, when the update data is update data of a part of the received write data,
the first storage node generates the plurality of update write data blocks so as to include a data block consisting of data in the update data and a dummy data block consisting of dummy data,
in the arrangement of the dummy data block, notification of the dummy data block is performed without transmitting the dummy data block to an arrangement destination storage node, and
the arrangement destination storage node of the dummy data block is managed by management information, without storing the dummy data block.

10. The storage system according to claim 9,
wherein the third redundant data block is a redundant data block of a stripe comprising a largest number of latest data blocks in stripes of a plurality of check points.

11. The storage system according to claim 8,
wherein the second storage node selects the plurality of distributedly arranged write data blocks from latest data.

12. The storage system according to claim 1,
wherein priority of a rearrangement destination storage node of an object used by a host program as a storage node for arranging the host program is higher than that of a storage node not holding an object used by the host program.

13. A non-transitory computer-readable memory medium including a code, wherein the code is executed by a processor in a storage system to cause the storage system to perform a process,
the storage system comprises a first storage node, a second storage node, and a third storage node, which are connected via a network,
the process is performed so that the first storage node receives write data of an object,
the first storage node generates a plurality of distributedly arranged write data blocks from the write data and generates a first redundant data block from the plurality of distributedly arranged write data blocks,
the first storage node transmits each of the plurality of distributedly arranged write data blocks and the first redundant data block to different storage nodes,
the different storage nodes comprise the second storage node and the third storage node, and an arrangement destination of the first redundant data block is the third storage node,
the second storage node selects a plurality of distributedly arranged write data blocks from distributedly arranged write data blocks held therein, rearrangement destination storage nodes of the plurality of selected distributedly arranged write data blocks are different from one another, and an arrangement destination of a second redundant data block generated from the plurality of selected distributedly arranged write data blocks is the third storage node,
the second storage node generates the second redundant data block from the plurality of selected distributedly arranged write data blocks, and
the second storage node rearranges each of the plurality of selected distributedly arranged write data blocks to the rearrangement destination storage node and further arranges the second redundant data block to a storage node other than the rearrangement destination storage node, so that the write data of the object received by the first storage node is rearranged to any one of the plurality of storage nodes.

* * * * *